United States Patent
Bhattacharya et al.

(10) Patent No.: US 8,068,802 B2
(45) Date of Patent: *Nov. 29, 2011

(54) ESTIMATING THE LOCATION OF A WIRELESS TERMINAL BASED ON CALIBRATED SIGNAL-STRENGTH MEASUREMENTS

(75) Inventors: Tarun Kumar Bhattacharya, San Jose, CA (US); Martin Feuerstein, Redmond, WA (US); David Stevenson Spain, Jr., Portola Valley, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/877,774

(22) Filed: Sep. 8, 2010

(65) Prior Publication Data

US 2010/0329144 A1 Dec. 30, 2010

Related U.S. Application Data

(63) Continuation of application No. 11/080,861, filed on Mar. 15, 2005, now Pat. No. 7,796,966.

(51) Int. Cl.
H04B 7/00 (2006.01)

(52) U.S. Cl. .................. 455/231; 455/67.11; 455/67.13; 455/115.1

(58) Field of Classification Search .................. 455/231, 455/67.11, 67.13, 115.1, 456, 67.14, 115.3, 455/456.1, 63.1
See application file for complete search history.

(56) References Cited

U.S. PATENT DOCUMENTS

| | | | | |
|---|---|---|---|---|
| 5,423,067 A * | 6/1995 | Manabe | ......................... | 455/524 |
| 5,634,192 A * | 5/1997 | Meche et al. | .................. | 455/437 |
| 5,862,487 A * | 1/1999 | Fujii et al. | ...................... | 455/454 |
| 5,963,865 A * | 10/1999 | Desgagne et al. | ............. | 455/450 |
| 5,970,407 A * | 10/1999 | Brunner et al. | ................ | 455/437 |
| 6,112,093 A * | 8/2000 | Nordlund | ....................... | 455/450 |
| 6,119,011 A * | 9/2000 | Borst et al. | ................. | 455/452.2 |
| 6,230,018 B1 * | 5/2001 | Watters et al. | .............. | 455/456.3 |

(Continued)

FOREIGN PATENT DOCUMENTS

WO 9815149 A1 4/1998

(Continued)

OTHER PUBLICATIONS

Dionisi, M., "EP Application No. 06736252.5 Office Action Nov. 18, 2008", , Publisher: EPO, Published in: EP.

(Continued)

*Primary Examiner* — Minh D Dao
(74) *Attorney, Agent, or Firm* — DeMont & Breyer, LLC

(57) ABSTRACT

A process and machine for estimating the location of a wireless terminal is disclosed. The illustrative embodiment of the present invention is based on the observation that the signal strength of a signal from a transmitter is different at some locations, and, therefore, the location of a wireless terminal can be estimated by comparing the signal strength it currently observes against a map or database that correlates locations to signal strengths. In accordance with a first example, if a particular radio station is known to be received well at a first location and poorly at a second location, and a given wireless terminal at an unknown location is receiving the radio station poorly, it is more likely that the wireless terminal is at the second location than it is at the first location.

34 Claims, 23 Drawing Sheets

U.S. PATENT DOCUMENTS

| | | | |
|---|---|---|---|
| 6,233,454 B1 * | 5/2001 | Sato | 455/437 |
| 6,236,365 B1 * | 5/2001 | LeBlanc et al. | 342/457 |
| 6,249,252 B1 * | 6/2001 | Dupray | 342/450 |
| 6,343,212 B1 * | 1/2002 | Weber et al. | 455/404.1 |
| 6,351,642 B1 * | 2/2002 | Corbett et al. | 455/442 |
| 6,560,442 B1 | 5/2003 | Yost et al. | |
| 6,631,263 B1 * | 10/2003 | Corkery | 455/436 |
| 6,801,511 B2 * | 10/2004 | Park | 370/331 |
| 6,819,927 B1 * | 11/2004 | Sato | 455/437 |
| 7,065,361 B1 * | 6/2006 | Fortuna | 455/438 |
| 7,283,787 B2 * | 10/2007 | Diao et al. | 455/11.1 |
| 7,796,966 B2 * | 9/2010 | Bhattacharya et al. | 455/231 |
| 2001/0022558 A1 | 9/2001 | Karr et al. | |
| 2001/0051520 A1 * | 12/2001 | Johansson et al. | 455/423 |
| 2003/0103475 A1 * | 6/2003 | Heppe et al. | 370/321 |
| 2004/0203717 A1 * | 10/2004 | Wingrowicz et al. | 455/423 |
| 2004/0203921 A1 * | 10/2004 | Bromhead et al. | 455/456.1 |
| 2005/0020309 A1 | 1/2005 | Moeglein et al. | |
| 2005/0136845 A1 * | 6/2005 | Masuoka et al. | 455/67.14 |
| 2005/0153653 A1 * | 7/2005 | Diao et al. | 455/11.1 |
| 2005/0227703 A1 * | 10/2005 | Cheng | 455/456.1 |
| 2006/0116131 A1 * | 6/2006 | Morgan et al. | 455/456.1 |
| 2006/0160490 A1 * | 7/2006 | Melero | 455/67.11 |
| 2007/0042716 A1 * | 2/2007 | Goodall et al. | 455/67.11 |
| 2007/0155401 A1 * | 7/2007 | Ward et al. | 455/456.1 |
| 2008/0188236 A1 * | 8/2008 | Alles et al. | 455/456.1 |
| 2008/0188244 A1 * | 8/2008 | Mazlum et al. | 455/456.6 |

FOREIGN PATENT DOCUMENTS

| | | |
|---|---|---|
| WO | 0128272 A1 | 4/2001 |
| WO | 2004106964 A2 | 12/2004 |

OTHER PUBLICATIONS

Dionisi, M., "PCT Application No. PCT/US2006/006893 International Preliminary Report on Patentability Feb. 21, 2007", , Publisher: PCT, Published in: PCT.

Dionisi, M., "PCT Application No. PCT/US2006/006893 International Search Report Jun. 30, 2006", , Publisher: PCT, Published in: PCT.

Dao, Minh D., "U.S. Appl. No. 11/080,861 Notice of Allowance May 18, 2010", , Publisher: USPTO, Published in: US.

Dao, Minh D., "U.S. Appl. No. 11/080,861 Office Action Feb. 1, 2010", , Publisher: USPTO, Published in: US.

Dao, Minh D., "U.S. Appl. No. 11/080,861 Office Action Apr. 30, 2009", , Publisher: USPTO, Published in: US.

Akbar, Muhammad A., "U.S. Appl. No. 11/080,861 Office Action Apr. 4, 2008", , Publisher: USPTO, Published in: US.

Akbar, Muhammad A., "U.S. Appl. No. 11/080,861 Office Action Aug. 10, 2007", , Publisher: USPTO, Published in: US.

Dao, Minh D., "U.S. Appl. No. 11/080,861 Office Action Aug. 13, 2009", , Publisher: USPTO, Published in: US.

Dao, Minh D., "U.S. Appl. No. 11/080,861 Office Action Aug. 22, 2008", , Publisher: USPTO, Published in: US.

* cited by examiner

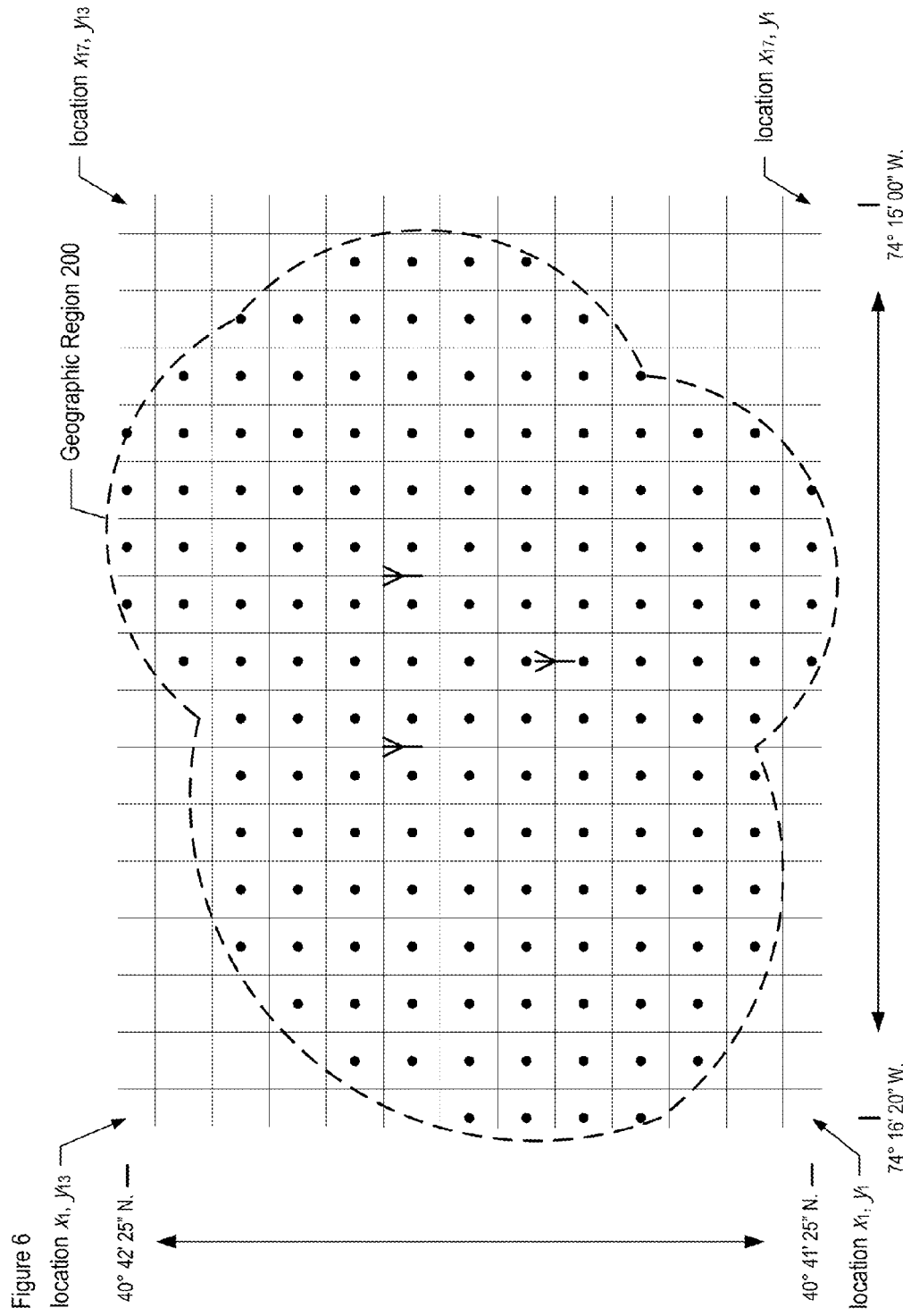

ESTIMATING THE LOCATION OF A WIRELESS TERMINAL BASED ON CALIBRATED SIGNAL-STRENGTH MEASUREMENTS

CROSS REFERENCE TO RELATED APPLICATIONS

This application is a continuation of U.S. patent application Ser. No. 11/080,861, filed 15 Mar. 2005 which is incorporated by reference.

FIELD OF THE INVENTION

The present invention relates to telecommunications in general, and, more particularly, to a technique for estimating the location of a wireless terminal.

BACKGROUND

FIG. 1 depicts a map of a geographic region that is serviced by a wireless telecommunications system, which system provides wireless telecommunications service to wireless terminals (e.g., wireless terminal 101) within the region. The heart of the telecommunications system is wireless switching center 110, which might also be known as a mobile switching center ("MSC") or a mobile telephone switching office ("MTSO").

Typically, wireless switching center 111 is connected through a plurality of intermediate network elements (e.g., base station controllers, etc.) to a plurality of base stations (e.g., base stations 102-1, 102-2, and 102-3), which are dispersed throughout the geographic area serviced by the system. As depicted in FIG. 1, base station 102-2 serves wireless terminal 101.

As is well known to those skilled in the art, wireless switching center 111 is responsible for, among other things, establishing and maintaining calls between wireless terminals and between a wireless terminal and a wireline terminal (which is connected to the system via the local and/or long-distance telephone networks and which are not shown in FIG. 1).

The salient advantage of wireless telecommunications over wireline telecommunications is the mobility that is afforded to the users of the wireless telecommunications system. On the other hand, the salient disadvantage of wireless telecommunications lies in that fact that because the user is mobile, an interested party might not be able to readily ascertain the location of the user.

Such interested parties might include both the user of the wireless terminal and remote parties. There are a variety of reasons why the user of a wireless terminal might be interested in knowing his or her location. For example, the user might be interested in telling a remote party where he or she is.

There are a variety of reasons why a remote party might be interested in knowing the location of the user. For example, the recipient of a 911 emergency call from a wireless terminal might be interested in knowing the location of the wireless terminal so that emergency services vehicles can be dispatched to that location.

There are many techniques in the prior art for estimating the location of a wireless terminal.

In accordance with one technique, the location of a wireless terminal is estimated to be at the center of the cell in which the wireless terminal is located. This technique is advantageous in that it does not require that additional hardware be added to the wireless terminal or to the wireless telecommunications system, and, therefore, the first technique can be inexpensively implemented in legacy systems. The first technique is only accurate, however, to within a few kilometers, and, therefore, it is generally not acceptable for applications (e.g., emergency services dispatch, etc.) that require higher accuracy.

In accordance with a second technique, the location of a wireless terminal is estimated by triangulating the angle of arrival or the time of arrival of the signals transmitted by the wireless terminal to be located at various receivers. This technique is accurate to within a few hundreds of meters and is advantageous in that it can be used with legacy wireless terminals. It is disadvantageous, however, in that it generally requires that hardware be added to the telecommunication system's base stations. This causes the second technique to be very expensive.

In accordance with a third technique, the location of a wireless terminal is estimated by a radio navigation unit, such as, for example, a Global Positioning System (GPS) receiver, that is incorporated into the wireless terminal. This technique is accurate to within tens of meters and is advantageous in that it does not require that additional hardware be added to the telecommunication system's infrastructure. The third technique is disadvantageous, however, in that it cannot be used with legacy wireless terminals that do not comprise a radio navigation unit.

Therefore, the need exists for a technique for estimating the location of a wireless terminal with higher resolution than the first technique and that can be inexpensively implemented in legacy systems.

SUMMARY OF THE INVENTION

The present invention enables the estimation of the location of a wireless terminal without the addition of hardware to either the wireless terminal or to the telecommunication system's base stations. Some embodiments of the present invention are, therefore, ideally suited for use with legacy systems.

The illustrative embodiment of the present invention is based on the observation that the signal strength of a signal from a transmitter is different at some locations, and, therefore, the location of a wireless terminal can be estimated by comparing the signal strength it currently observes against a map or database that correlates locations to signal strengths. In accordance with a first example, if a particular radio station is known to be received well at a first location and poorly at a second location, and a given wireless terminal at an unknown location is receiving the radio station poorly, it is more likely that the wireless terminal is at the second location than it is at the first location.

When this same principal is applied to multiple transmitters and multiple signals, the location of a wireless terminal can be estimated with greater accuracy. A second example illustrates this point. A first radio station, Radio Station A, can be received well at Location 1 and Location 2, but poorly at Location 3 and Location 4, and a second radio station, Radio Station B, can be received well at Location 1 and Location 3, but poorly at Location 2 and Location 4. This information is summarized in the table below and forms the basis for a map or database that correlates location to expected signal strength.

TABLE 1

First Illustrative Expected Signal-Strength Database

|  | Radio Station A | Radio Station B |
|---|---|---|
| Location 1 | Good Reception | Good Reception |
| Location 2 | Good Reception | Poor Reception |
| Location 3 | Poor Reception | Good Reception |
| Location 4 | Poor Reception | Poor Reception |

If a given wireless terminal at an unknown location can receive Radio Station A poorly and Radio Station B well, it is more likely that the wireless terminal is at Location 3 than it is at either Location 1, 2, or 4.

The qualitative categorization of signal strengths is only useful when there are a small number of candidate locations for the wireless terminal and when no two locations have the same relative signal strength. For real-world applications—those in which there are hundreds or thousands of candidate locations—the estimated and measured signal strengths must be quantified.

In accordance with a third example, if a first radio station, Radio Station A, can be received at −56 dBm at Location 1, −42 dBm at Location 2, −63 dBm at Location 3, and −61 dBm at Location 4, and a second radio station, Radio Station B, can be received at −63 dBm at Location 1, −56 dBm at Location 2, −65 dBm at Location 3, and −52 dBm at Location 4. This information is summarized in the table below and forms the basis for a map or database that correlates location to expected signal strength.

TABLE 2

Second Illustrative Expected Signal-Strength Database

|  | Radio Station A | Radio Station B |
|---|---|---|
| Location 1 | −56 dBm | −63 dBm |
| Location 2 | −42 dBm | −56 dBm |
| Location 3 | −63 dBm | −65 dBm |
| Location 4 | −61 dBm | −52 dBm |

If a given wireless terminal at an unknown location receives Radio Station A at −42 dBm and Radio Station B at −56 dBm, then the wireless terminal is more likely to be at Location 2 than it is at Location 1, 3, or 4.

But if the design or manufacture of the wireless terminal is such that it does not measure signal strengths very accurately, the problem of matching signal-strength measurements to those at a location can become very difficult. A fourth example illustrates this point, if a given wireless terminal at an unknown location receives Radio Station A at −47 dBm and Radio Station B at −61 dBm, then it isn't at all readily apparent from Table 2 where the wireless terminal is most likely to be.

In accordance with the illustrative embodiment, the error in a wireless terminal's signal-strength measurements is compensated for based on some knowledge of how the wireless terminal incorrectly measures signal strength. For example, if one make and model of wireless terminal always measures a signal as 5 dBm less powerful than it actually is, the illustrative embodiment adds 5 dBm to the terminal's reported signal-strength measurements before it tries to match those measurements against the values in the expected signal-strength database. As a fifth example, if it is known that the wireless terminal in the fourth example above always measures a signal as 5 dBm less powerful than it actually is, then the reported measurements of −47 dBm and −61 dBm are calibrated to −42 dBm and −56 dBm, respectively. By using the calibrated signal-strength measurements, −42 dBm and −56 dBm, it is much more readily apparent that the wireless terminal is more likely to be at Location 2 than it is at Location 1, 3, or 4.

This principal assumes, however, that the wireless terminal distorts the signal-strength measurements by a constant amount. In the real-world, however, this isn't generally so, and, therefore, the illustrative embodiment compensates for all kinds of distortions.

Wireless terminals of the same make and model can often report a different value for a signal's strength in the same location. This is due to various factors including the condition of the wireless terminal's antenna, the state of its battery, and whether the terminal is inside a vehicle.

The illustrative embodiment ameliorates the effects of these biases by pattern matching not the calibrated signal-strength measurements themselves to the predicted signal strengths themselves, but by pattern matching the pair-wise differentials of the calibrated signals strengths to the pair-wise differentials of the expected signal strengths.

TABLE 3

Third Illustrative Expected Signal-Strength Database

|  | Radio Station A | Radio Station B | Difference |
|---|---|---|---|
| Location 1 | −56 dBm | −63 dBm | −7 dBm |
| Location 2 | −42 dBm | −56 dBm | −14 dBm |
| Location 3 | −63 dBm | −65 dBm | −2 dBm |
| Location 4 | −61 dBm | −52 dBm | 9 dBm |

As a six example, if a given wireless terminal with a broken antenna and at an unknown location receives Radio Station A at −57 dBm and Radio Station B at −71 dBm, then it registers Radio Station A as 14 dBm stronger than Radio Station B. By matching the difference in the signal strengths between the two signals against their expected difference, this suggests that the wireless terminal is more likely to be at Location 2 than it is at Location 1, 3, or 4. The illustrative embodiment also uses the differences in calibrated signal-strength measurements to estimate the location of a wireless terminal.

A disadvantage of this approach is that the common bias is eliminated at the expense of (1) doubling the variance of the random measurement noise, and (b) by reducing the number of data points to match by one. Furthermore, the pair-wise subtraction introduces correlation into the relative signal-strength measurement errors (i.e., all of the data points to be matched are statistically correlated). It will be clear to those skilled in the art how to account for this correlation in calculating the likelihood of the measurement report.

The illustrative embodiment comprises: receiving a first reported signal-strength measurement, $R(1,n)$, from a wireless terminal; and generating a first calibrated signal-strength measurement, $S(1,n)$, based on: (i) the first reported signal-strength measurement, $R(1,n)$, and (ii) a characteristic, C, of the wireless terminal.

BRIEF DESCRIPTION OF THE DRAWINGS

FIG. 6 depicts a map of how geographic region 200 is partitioned into 221 locations in accordance with the illustrative embodiment of the present invention.

DETAILED DESCRIPTION

Figure 1:
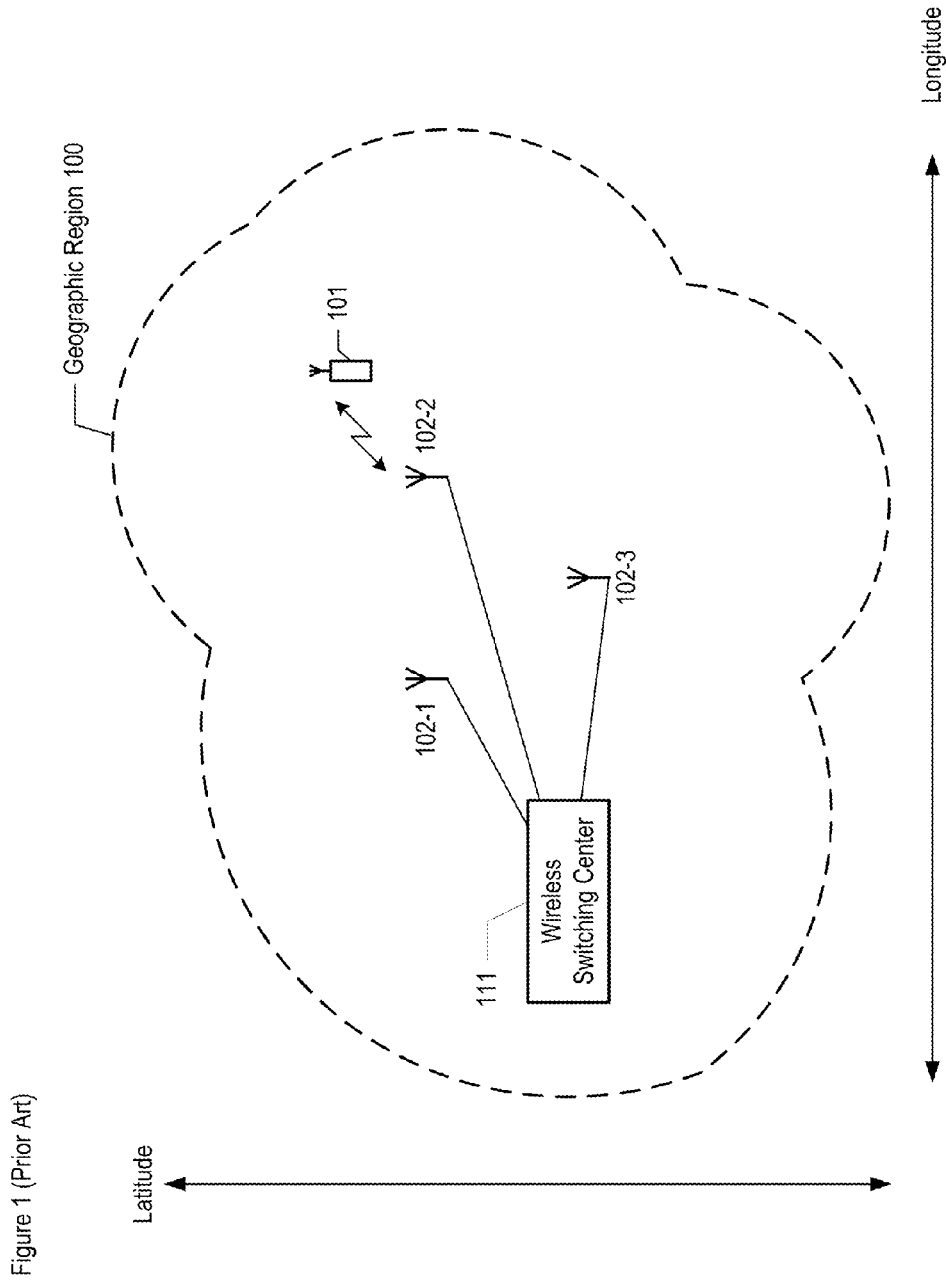
FIG. 1 depicts a map of a portion of a wireless telecommunications system in the prior art.
Figure 2:
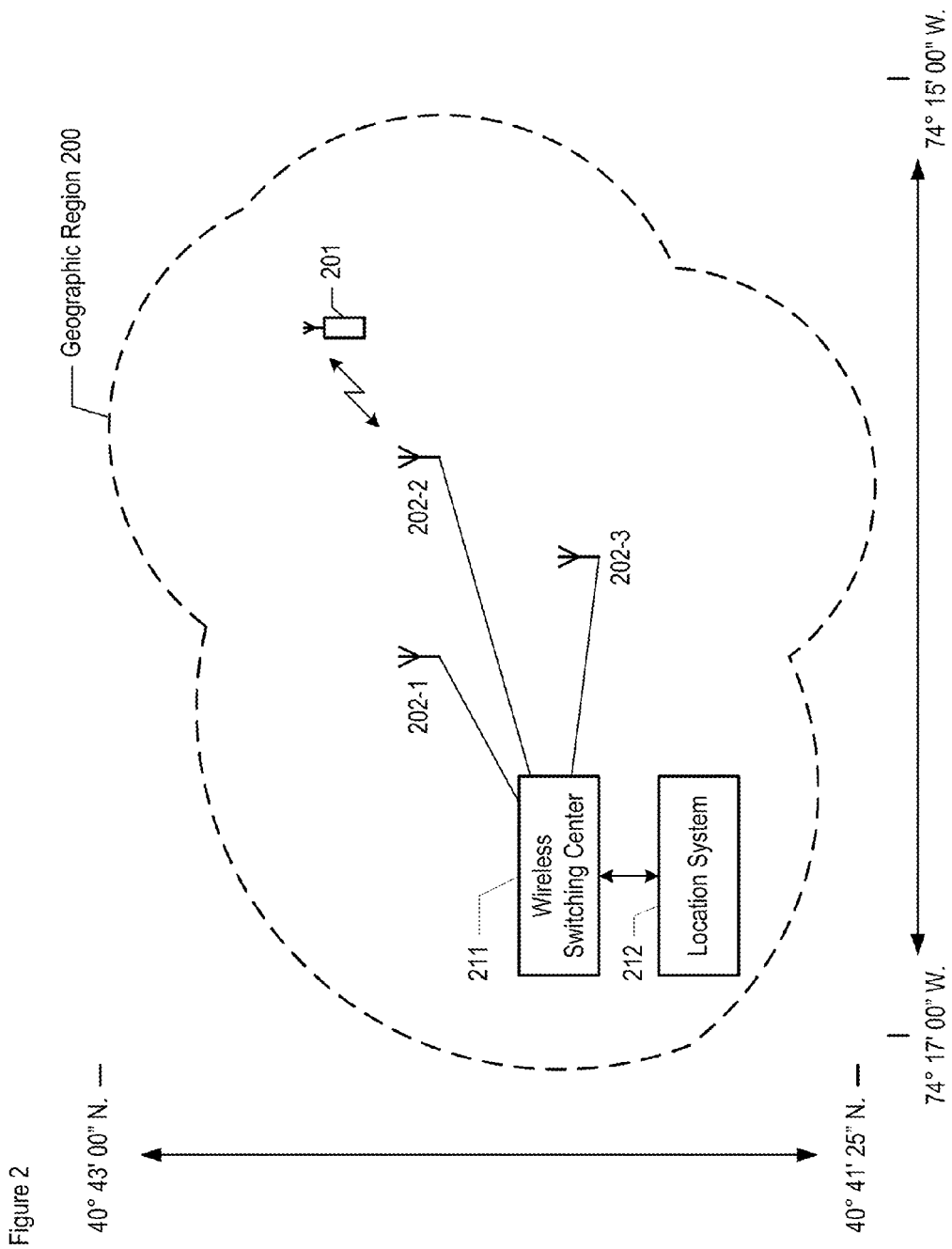
FIG. 2 depicts a map of the illustrative embodiment of the present invention.

FIG. 2 depicts a map of the illustrative embodiment of the present invention, which comprises: wireless switching center 211, location system 212, base stations 202-1, 202-2, and 202-3, and wireless terminal 201, which are interconnected as shown. The illustrative embodiment provides wireless telecommunications service to all of geographic region 200, in well-known fashion, and is also capable of estimating the location of wireless terminal 201 within geographic region 200, as described below.

The illustrative embodiment operates in accordance with the Global System for Mobile Communications (formerly known as the Groupe Speciale Mobile), which is ubiquitously known as "GSM," and the General Packet Radio Service, which is ubiquitously known as "GPRS." After reading this disclosure, however, it will be clear to those skilled in the art how to make and use alternative embodiments of the present invention that operate in accordance with other protocols, such as, for example, the Universal Mobile Telephone System ("UMTS"), CDMA-2000, IS-136 TDMA, Short Message Service, Circuit Switched Data, etc.

Wireless switching center 211 is a switching center as is well-known to those skilled in the art and is capable of relaying GPRS packet data back and forth between wireless terminal 201 and location system 212. It will be clear to those skilled in the art how to make and use wireless switching center 211. It will also be clear to those skilled in the art that wireless switching centers in the prior art are also known by other names, such as, for example, mobile switching center, mobile telephone switching offices, etc.

The illustrative embodiment comprises one wireless switching system, but after reading this disclosure it will be clear to those skilled in the art how to make and use alternative embodiments of the present invention that use two or more systems to obtain signal-strength measurements. Typically, this is useful when a wireless terminal is near the boundary of one or more systems. When two or more systems are used to obtain signal-strength measurements, one wireless switching center can use the IS-41 protocol messages HandoffMeasurementRequest and HandoffMeasurementRequest2 to elicit signal-strength measurements from another.

Base stations 202-1, 202-2, and 202-3 are well-known to those skilled in the art and communicate with wireless switching center 211 through cables and other equipment (e.g., base station controllers, etc.) that are not shown in FIG. 2. As depicted in FIG. 2, wireless terminal 201 is serviced by base station 202-2. Although the illustrative embodiment comprises three base stations, it will be clear to those skilled in the art, after reading this disclosure, how to make and use alternative embodiments of the present invention that comprise any number of base stations.

Wireless terminal 201 is a GSM-compliant wireless terminal with GPRS packet data capability. After reading this disclosure, however, it will be clear to those skilled in the art how to make and use alternative embodiments of the present invention that operate in accordance with other protocols, such as, for example, the Universal Mobile Telephone System ("UMTS"), CDMA-2000, IS-136 TDMA, Short Message Service, and Circuit Switched Data, etc.

Wireless terminal 201 is equipped, in well-known fashion, with the hardware and software necessary to measure and report to wireless switching center 211 on the signal strength of signals from base stations 202-1, 202-2, and 202-3. Furthermore, wireless terminal 201 is equipped with the software necessary to report to location system 212, via GPRS packets, the characteristic, C, of wireless terminal 201. The knowledge of the characteristic, C, is used by location system 212 to calibrate the reported signal-strength measurements transmitted by wireless terminal 201. This is described in detail below and with respect to FIGS. 4, 11, and 16. In accordance with the illustrative embodiment, the characteristic, C, of wireless terminal 201 is the make and model of wireless terminal 201.

In accordance with the illustrative embodiment of the present invention all of the specific portions of the radio frequency spectrum fall within the same band that wireless terminal 201 uses to communicate with base stations 202-1, 202-2, and 202-3. In some alternative embodiments of the present invention, however, some or all of the signals measured and reported by wireless terminal 201 are outside the band that wireless terminal 201 uses to communicate with base stations 202-1, 202-2, and 202-3. Those signals can be, for example, commercial television or radio signals, aviation navigation signals, etc. In any case, it will be clear to those skilled in the art, after reading this disclosure, how to make and use wireless terminal 201.

Location system 212 is a data processing system that is capable of estimating the location of wireless terminal 201 in the manner described in detail below. Although the illustrative embodiment depicts location system 212 as estimating the location of only one wireless terminal—wireless terminal 201—it will be clear to those skilled in the art, after reading this disclosure, how to make and use alternative embodiments of the present invention that are capable of estimating the location of any number of wireless terminals.

Location system 212 is capable of receiving reports from wireless switching center 211, as described in detail below, which contain the reported signal-strength measurements from wireless terminal 201 for the base stations that are on wireless terminal 201's list of neighboring base stations. The reported signal-strength measurements in a report are made at substantially the same time, and the signal-strength measurements in different reports are made at substantially different times. It will be clear to those skilled in the art, however, after reading this disclosure, how to make and use alternative embodiments of the present invention in which a single report comprises reported signal-strength measurements made at substantially different, but documented, times.

Furthermore, although location system 212 is depicted in FIG. 2 as being physically distinct from wireless switching center 211, it will be clear to those skilled in the art, after reading this disclosure, how to make and use alternative embodiments of the present invention in which location system 212 resides wholly or partially within wireless switching center 211.

In accordance with the illustrative embodiment, location system 212 communicates with wireless switching center 211 via a local area network, but it will be clear to those skilled in the art, after reading this disclosure, how to make and use alternative embodiments of the present invention in which location system 212 communicates with wireless switching center 211 via a different network such as, for example, the Internet, the public telephone switched network, etc.

Furthermore, although wireless switching center 211, location system 212, and base stations 202-1, 202-2, and 202-3 are depicted in FIG. 2 as being within geographic region 200 (i.e., the region of candidate locations for wireless terminal 201), this is not necessarily so, and it will be clear to those skilled in the art, after reading this disclosure, how to make and use alternative embodiments of the present invention in which some or all of these pieces of equipment are not within the region of location estimation.

Figure 3:
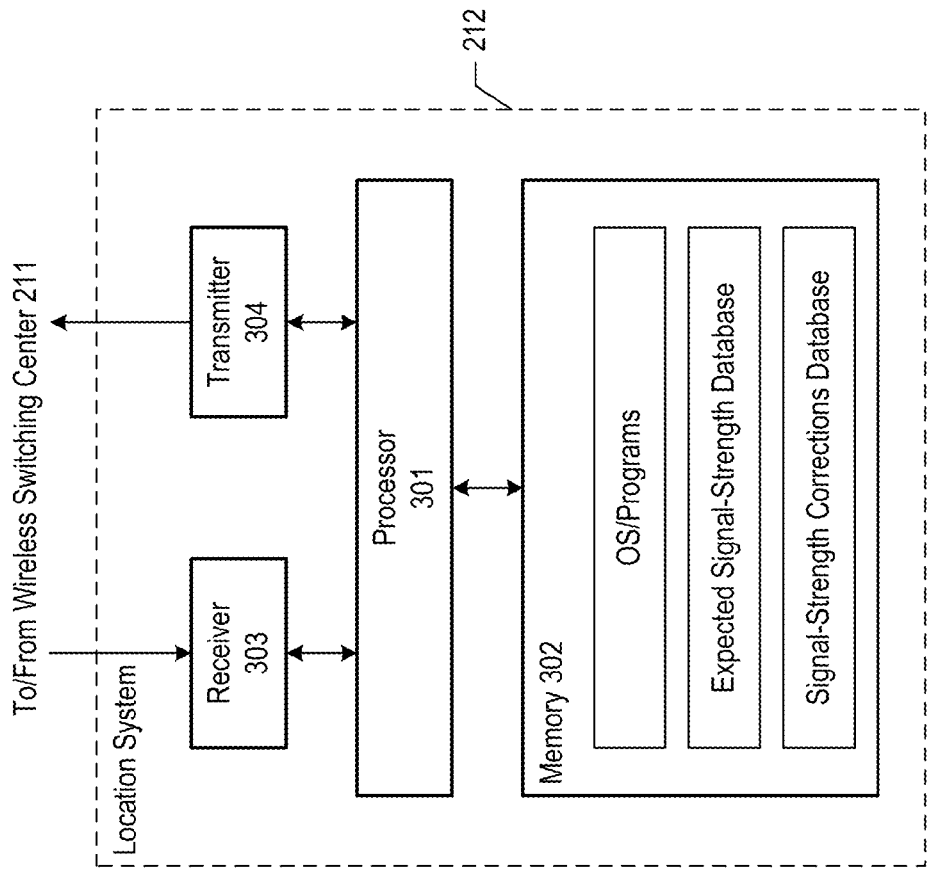
FIG. 3 depicts a block diagram of the salient components of location system 212 in accordance with the illustrative embodiment.

FIG. 3 depicts a block diagram of the salient components of location system 212 in accordance with the illustrative embodiment. Location system 212 comprises: processor 301, memory 302, receiver 303, and transmitter 304, which are interconnected as shown.

Processor 301 is a general-purpose processor as is well-known in the art that is capable of executing the operating system and user programs in memory 302, and of populating, amending, accessing, and generally managing the Expected Signal-Strength Database and the Signal-Strength Corrections Database in memory 302. The user programs perform the tasks described below and with respect to FIGS. 4 through 18. Processor 302 is also capable of receiving input from receiver 303 and sending output to transmitter 304 in well-known fashion.

Memory 302 is a non-volatile memory that stores:
 i. the operating system and user programs for processor 301,
 ii. the Expected Signal-Strength Database, and
 iii. the Signal-Strength Corrections Database,
as described below and with respect to FIGS. 4 through 18.

Receiver 303 receives information from wireless switching center 211 and wireless terminal 201, as disclosed below and with respect to FIG. 4, and forwards this information to processor 302.

Transmitter 304 receives output from processor 301 and transmits it to wireless switching center 211 and to wireless terminal 201 via wireless switching center 211 and GPRS.

Figure 4:
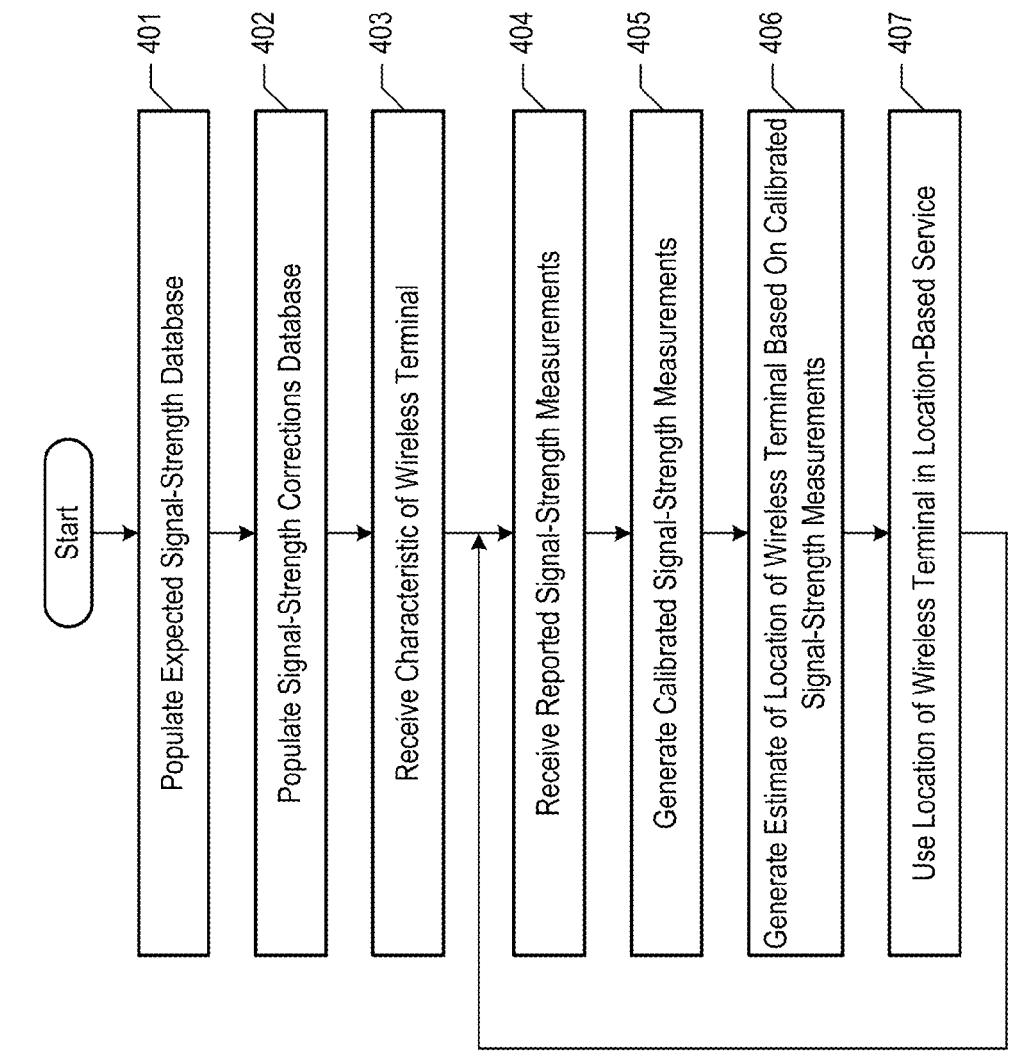
FIG. 4 depicts a broad overview of the salient tasks performed by the illustrative embodiment in estimating the location of wireless terminal 201 in geographic region 200.

Overview—FIG. 4 depicts a broad overview of the salient tasks performed by the illustrative embodiment in estimating the location of wireless terminal 201. The overall process of estimating the location of wireless terminal 201 is described as comprising seven distinct tasks. It will be clear to those skilled in the art, however, after reading this disclosure, that the operations associated with some of these tasks can occur:
 i. concurrently, or
 ii. in a different order, or
 iii. together in one task, or
 iv. or any combination of i, ii, and iii.

The process of estimating the location of wireless terminal 201 comprises seven tasks:
 i. populating the Expected Signal-Strength Database,
 ii. populating the Signal-Strength Corrections Database,
 iii. receiving the characteristic of wireless terminal 201,
 iv. receiving the reported signal-strength measurements from wireless terminal 201,
 v. generating the calibrated signal-strength measurements based on (1) the reported signal-strength measurements and (2) the characteristic of wireless terminal 201,
 vi. generating a current estimate of the location of wireless terminal 201 based on (1) the calibrated signal-strength measurements and (2) previous estimates of the location of wireless terminal 201, and
 vii. using the estimated location of wireless terminal 201 in a location-based service.

The details of each of these tasks are described briefly below and in detail afterwards with respect to FIGS. 4 though 17.

At task 401, the Expected Signal-Strength Database is populated with the expected signal strengths of three signals at each location in geographic region 200. The three signals are Signal 1, Signal 2, and Signal 3.

Signal 1 is the control channel broadcast by base station 202-1 and its expected signal strength at location x,y at time t is represented by the function $E(1,x,y,t)$. Signal 2 is the overhead control channel broadcast by base station 202-2 and its expected signal strength at location x,y at time t is represented by the function $E(2,x,y,t)$. Signal 3 is the overhead control channel broadcast by base station 202-2 and its expected signal strength at location x,y at time t is represented by the function $E(3,x,y,t)$. For a given x,y location and time, these three functions together yield a 3-tuple of expected signal strengths designated as $\{E(1), E(2), E(3)\}$.

The control channels are used because they are broadcast at a constant power and because wireless terminal 201 can distinguish them from each other by their Base Station Identity Code. Task 401 is generally complex and potentially expensive, and it is, therefore, performed only when necessary. The details of task 401 are described in detail below and with respect to FIGS. 5 through 10.

At task 402, the Signal-Strength Corrections Database is populated with the calibration function for every possible make and model of wireless terminal 201. The calibration function enables location system 212 to calibrate the reported signal-strength measurements from wireless terminal 201 based on the make and model of wireless terminal. The details of task 402 are described in detail below and with respect to FIGS. 11 through 14.

At task 403, location system 212 receives a characteristic, C, of wireless terminal 201. In accordance with the illustrative embodiment, the characteristic, C, of wireless terminal 201 is the make and model of wireless terminal 201, and the characteristic, C, are received by location system 212 via GPRS packet data from wireless terminal 201 in response to a query for it from location system 212. It will be clear to those skilled in the art, after reading this disclosure, how to enable wireless terminal 201 to transmit and location system 212 to receive a characteristic, C, of wireless terminal 201.

In some alternative embodiments of the present invention, location system 212 receives the characteristic, C, of wireless terminal 201 from another source than wireless terminal 201. For example, location system 201 could be given the characteristic from the owner/operator of wireless switching center 211 when wireless terminal 201 is registered for service. This is advantageous in that it obviates the need for wireless terminal 201 to transmit the characteristic.

At task 404, location system 212 periodically receives a Signal-Strength Measurement Report from wireless terminal 201 at discrete relative time n, wherein n is a non-negative integer. Signal-Strength Measurement Report n comprises:
  i. a tuple of reported signal-strength measurements $\{R(1,n), R(2,n), R(3,n)\}$,
  ii. the real time, t, at which the signal-strength measurements were made, and
  iii. a value of n, which indicates the relative order in which the signal-strength measurements are made.

$R(1,n)$ is the nth reported signal-strength measurement of Signal 1 as measured by wireless terminal 201 at time t. Analogously, $R(2,n)$ is the nth reported signal-strength measurement of Signal 2 as measured by wireless terminal 201 at time t, and $R(3,n)$ is the nth reported signal-strength measurement of Signal 3 as measured by wireless terminal 201 at time t.

To facilitate this, wireless terminal 201 provides a temporal series (n, n+1, n+2, ..., etc.) of Signal-Strength Measurement Reports to wireless switching center 211, in well-known fashion, as part of the GSM protocol and the mobile-assisted hand-off process. Wireless switching center 211 then forwards the Reports to location system 212. The details of task 404 are described in detail below and with respect to FIG. 16.

In some alternative embodiments of the present invention, wireless terminal 201 provides the temporal series (n, n+1, n+2, ..., etc.) of Signal-Strength Measurement Reports to location system 212 via GPRS packets.

At task 405, location system 212 uses the reported signal-strength measurements $\{R(1,n), R(2,n), R(3,n)\}$ from task 404 and the calibration function for the make and model of wireless terminal 201 to generate a tuple of calibrated signal-strength measurements $\{S(1,n), S(2,n), S(3,n)\}$. The purpose of task 405 is to correct—or compensate for—the signal-strength measurement errors made by wireless terminal 201. The details of task 405 are described in detail below and with respect to FIG. 17.

At task 406, location system 212 generates a current estimate of the location of wireless terminal 201 based on:
  i. the tuple of calibrated signal-strength measurements $\{S(1,n), S(2,n), S(3,n)\}$,
  ii. the expected signal-strength tuples for all locations $\{E(1,x,y,t), E(2,x,y,t), E(3,x,y,t)\}$ at the time t when the measurements underlying $\{S(1,n), S(2,n), S(3,n)\}$ were made, and
  iii. the cumulative probability distribution for the location of wireless terminal 201, NB(x,y,n−1), wherein NB(x,y,n−1) is an x by y array of normalized probabilities for the location of wireless terminal based on all of the Signal-Strength Measurement Reports up to and including Report n−1.

The details of task 406 are described in detail below and with respect to FIGS. 17 and 18.

At task 407, location system 212 transmits the location estimated in task 406 to another entity (not shown) for use in a location-based service (e.g., Emergency 911 Service, etc.). It is well known to those skilled in the art, after reading this disclosure, how to use the estimated location of a wireless terminal in a location-based service.

At this point, each of these seven tasks is described in detail.

Figure 5:
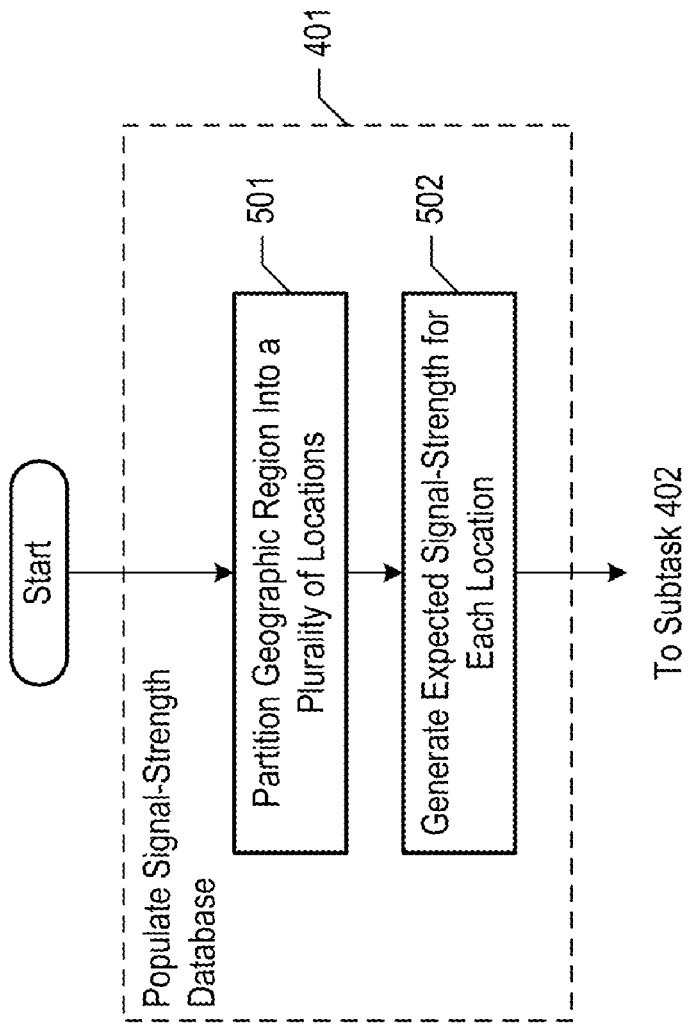
FIG. 5 depicts a flowchart of the salient subtasks performed as part of task 401.

Population of The Expected Signal-Strength Database— FIG. 5 depicts a flowchart of the salient subtasks performed as part of task 401.

At subtask 501, a rectangular grid of X by Y tessellated squares is overlaid onto geographic region 200 (see FIG. 6) and the center of each square represents a location.

In accordance with the illustrative embodiment, the grid is 17 by 13 and, therefore, comprises 211 squares. Each square has an area of approximately 5 arc-seconds in length by 5 arc-seconds in width. Only 152 of the 211 locations are within geographic region 200. In general, the size of the squares is chosen based on the following considerations.

First, the highest resolution with which wireless terminal 201 can be located is a function of the size of the squares. In particular, the wireless terminal can only be located to within one-half of the diagonal of a square or $$\frac{\sqrt{2}}{4}$$

or ≈0.3535 times the width of the square.

Second, as the size of each square decreases and the resolution increases, the number of locations increases exponentially and so does the computational burden in subtasks 1702 through 1705. This is discussed in detail below.

Third, as the size of each square decreases and the resolution increases, the likelihood increases that adjacent squares will have the identical or very similar signal-strength characteristics. In some embodiments of the present invention, this might cause the number of errors in estimating the location of wireless terminal 201 to increase.

With these considerations in mind, it will be clear to those skilled in the art, after reading this disclosure, how to make and use alternative embodiments of the present invention that operate with any number and size of squares. Furthermore, it will be clear to those skilled in the art, after reading this disclosure, how to make and use embodiments of the present invention that overlay a grid of another tessellated shape (e.g., triangles, rectangles, hexagons, etc.).

At subtask 502, the expected signal-strength functions E(1, x,y,t), E(2,x,y,t), and E(3,x,y,t) are generated, in well-known fashion.

Figure 7B:
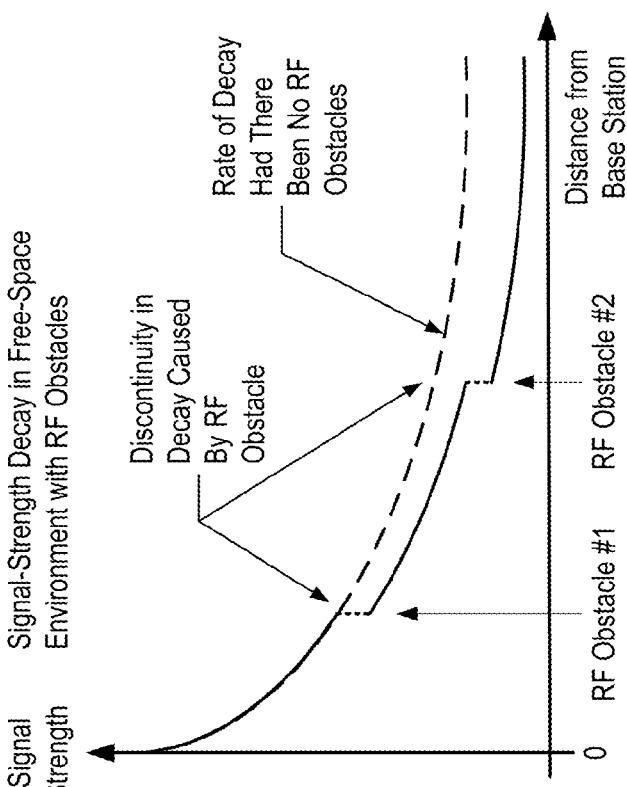
FIG. 7b depicts a graph that illustrates how that the signal strength of an electromagnetic signal decreases, in general, as a function of the distance from the transmitter and in an environment with two radio frequency obstacles.
Figure 7A:
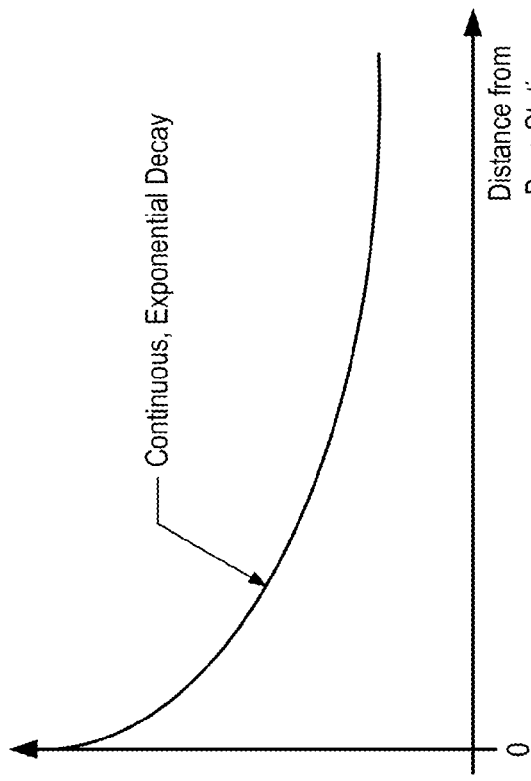
FIG. 7a depicts a graph that illustrates how the signal strength of an electromagnetic signal decreases, in general, as a function of the distance from the transmitter and in an environment with no radio frequency obstacles.

In general, the signal strength of an electromagnetic signal decreases as a function of the distance from the transmitter, as is depicted in FIG. 7a, but the topography of the region and the presence of buildings, trees, and other radio-frequency obstacles severely alters this generalization, as is depicted in FIG. 7b. This is why the expected signal-strength functions are a function of x and y.

Furthermore, the expected signal strength at each location is dynamic and changes, for example, with time as the atmospheric and meteorological conditions change. This is why the expected signal-strength functions are a function of time.

In accordance with the illustrative embodiment, the expected signal-strength functions E(1,x,y,t), E(2,x,y,t), and E(3,x,y,t) are generated based on a combination of:
 (i) a plurality of theoretical radio-frequency propagation models, and
 (ii) a plurality of empirical signal-strength measurements.

It will be clear to those skilled in the art, after reading this disclosure, how to perform subtask 502.

For example, one well-known modeling technique for outdoor radio-frequency signal propagation is adapted from the power-law decay model. The power-law decay model assumes that the base station's antenna is high above the ground and that there is line-of-sight propagation to the wireless terminal. In this case, the mean signal strength, P, received at the wireless terminal decays in inverse proportion to the square of the distance from the transmitter, $$P \propto \frac{1}{r^2}, \quad \text{(Eq. 1)}$$

up to some break-point. Beyond that break-point, the mean power at the wireless terminal decays in inverse proportion to the fourth power of the distance from the transmitter:

$$P \propto \frac{1}{r^4} \quad \text{(Eq. 2)}$$

As is well-known to those skilled in the art, the location of the break-point is the location at which the ground bounce signal interferes with the line-of-sight signal.

In accordance with another well-known model, the expected signal strength at each location is generated by taking empirical measurements at various locations and by interpolating for the locations in between the sampled locations. This method is advantageous in that it does not require many empirical measurements to be made, but it is less accurate than taking measurements at every location and causes the square of the uncertainty in the modeling error, $\delta_E^2$, to rise. The implications of this are discussed in detail below and with respect to FIG. 18.

It will be clear to those skilled in the art, after reading this disclosure, how to generate the expected signal-strength functions for each location in the geographic region whether through:
 i. one or more theoretical radio-frequency propagation models, or
 ii. one or more empirical signal-strength measurements, or
 iii. any combination of i and ii.

Figure 8:
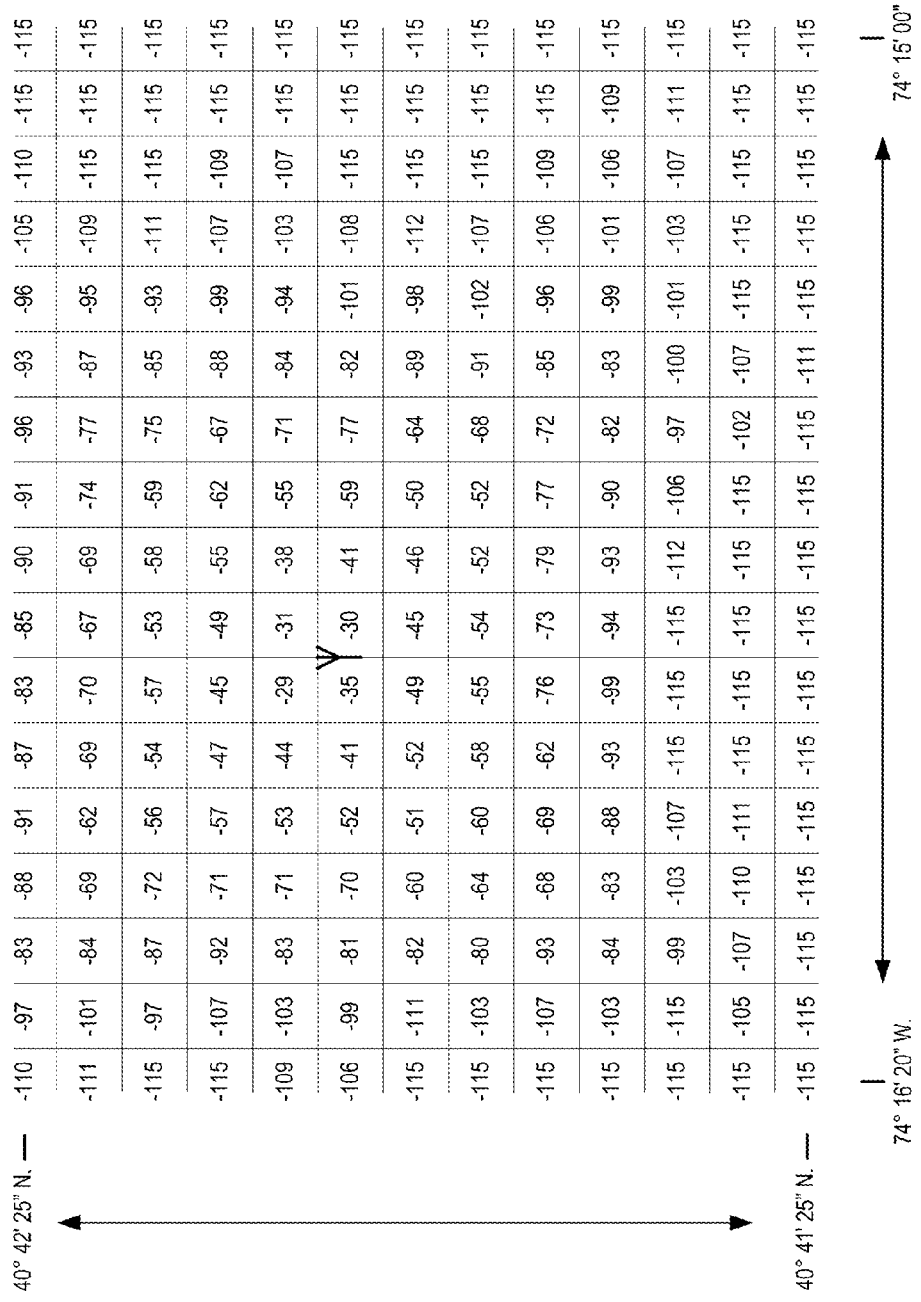
FIG. 8 depicts the expected signal strength, $E(1,t=0)$, of Signal 1 at each location at one illustrative moment in time and under one set of atmospheric and meteorological conditions.

In accordance with the illustrative embodiment, FIG. 8 depicts the expected signal strength, E(1,t=0), of Signal 1 at each location at one illustrative moment in time and under one set of atmospheric and meteorological conditions. In general, Signal 1 is, in general, stronger near base station 202-1 and weaker far away from base station 202-1.

Figure 9:
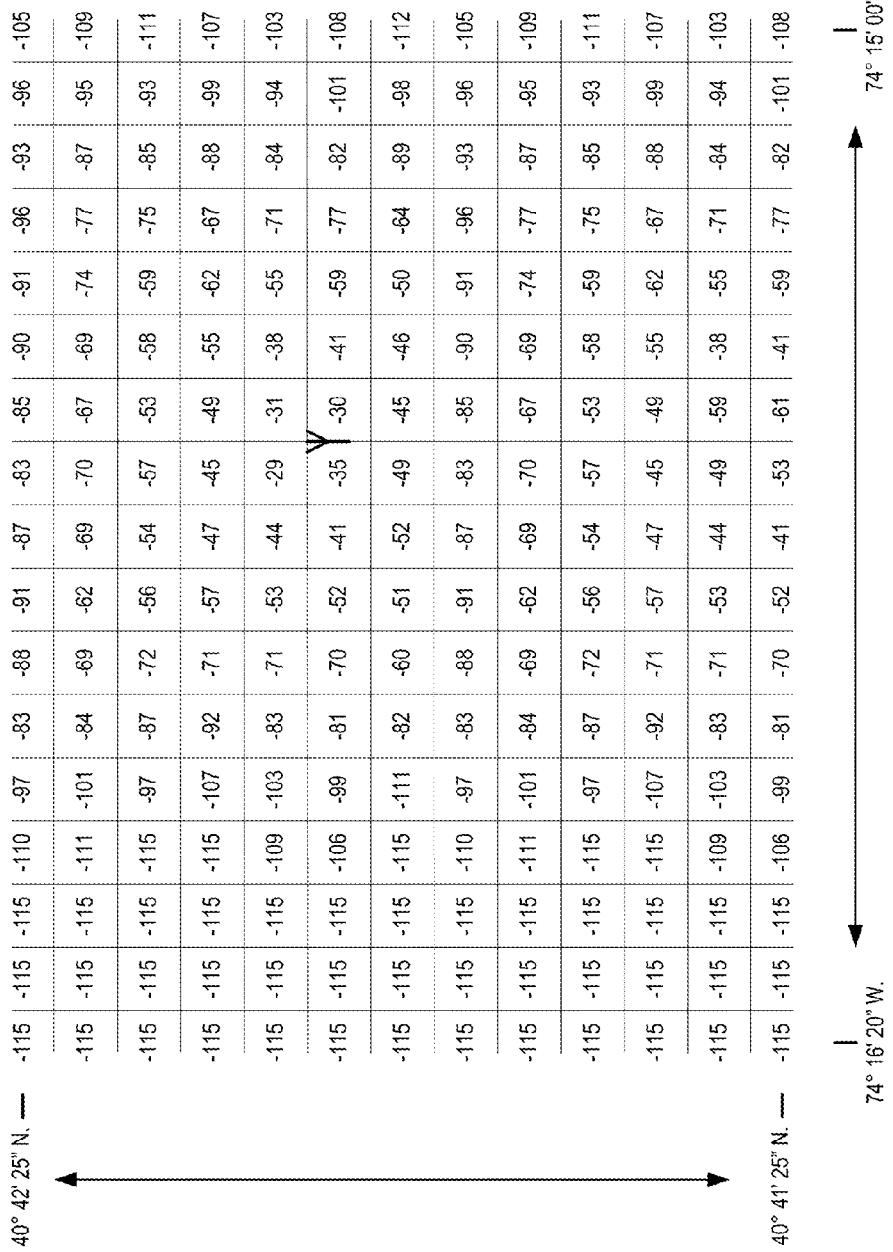
FIG. 9 depicts the expected signal strength, $E(2,t=0)$, of Signal 2 at each location at one illustrative moment in time and under one set of atmospheric and meteorological conditions.

In accordance with the illustrative embodiment, FIG. 9 depicts the expected signal strength, E(2,t=0), of Signal 2 at each location at one illustrative moment in time and under one set of atmospheric and meteorological conditions. Like Signal 1, Signal 2 is, in general, stronger near base station 202-2 and weaker far away from base station 202-2.

Figure 10:
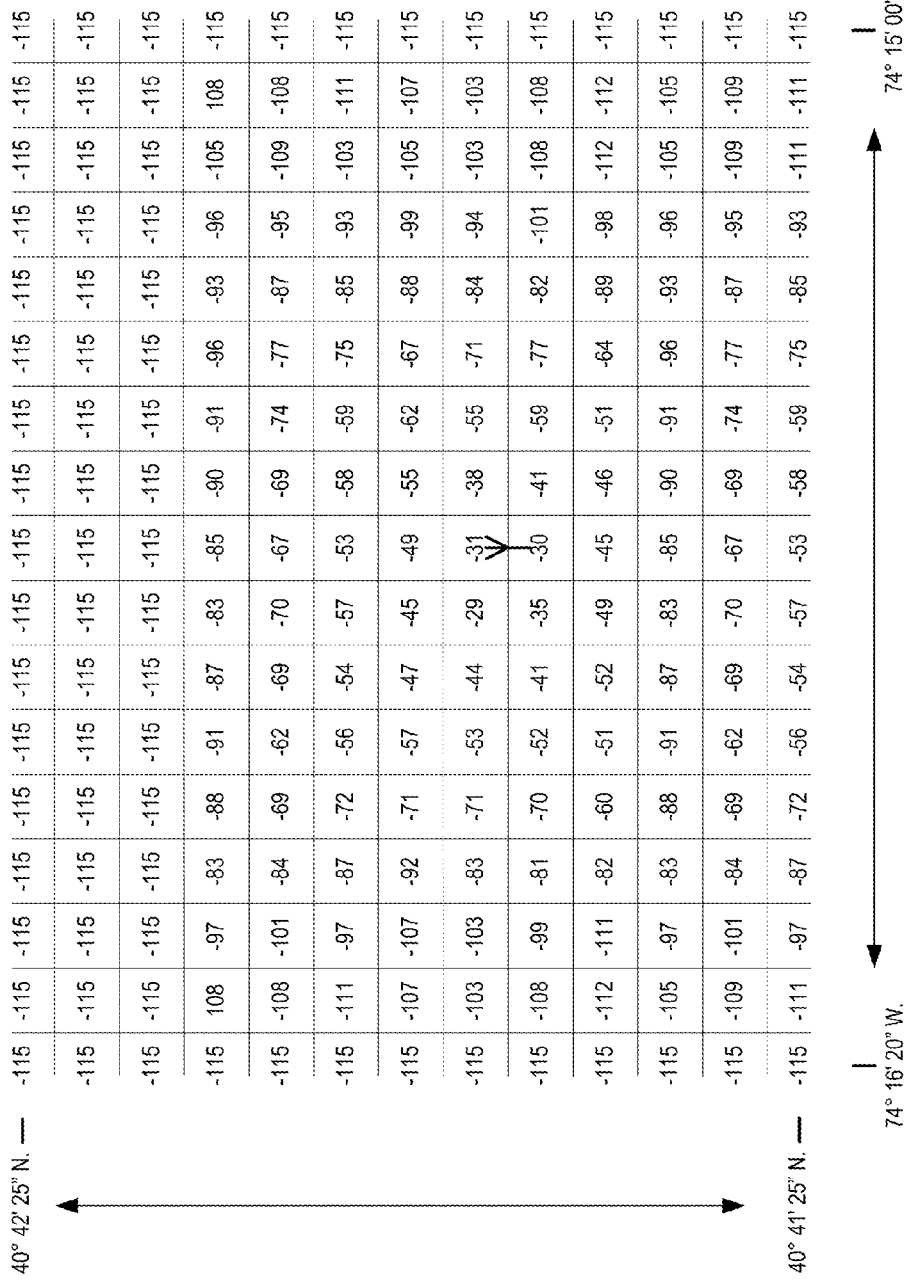
FIG. 10 depicts the expected signal strength, $E(3,t=0)$, of Signal 3 at each location at one illustrative moment in time and under one set of atmospheric and meteorological conditions.

In accordance with the illustrative embodiment, FIG. 10 depicts the expected signal strength, E(3,t=0), of Signal 3 at each location at one illustrative moment in time and under one set of atmospheric and meteorological conditions. Like Signals 1 and 2, Signal 3 is, in general, stronger near base station 202-3 and weaker far away from base station 202-3.

In general, the illustrative embodiment of the present invention estimates the location of a wireless terminal by pattern matching the calibrated signal-strength measurements {S(1,n), S(2,n), S(3,n)} against the expected signal-strength functions E(1,x,y,t), E(2,x,y,t), and E(3,x,y,t) that correspond in time to when the signal-strength measurements underlying {R(1,n), R(2,n), R(3,n)} are based. This process is described in detail below and with respect to task 406. From subtask 502, control passes to task 402 in FIG. 4.

Figure 11:
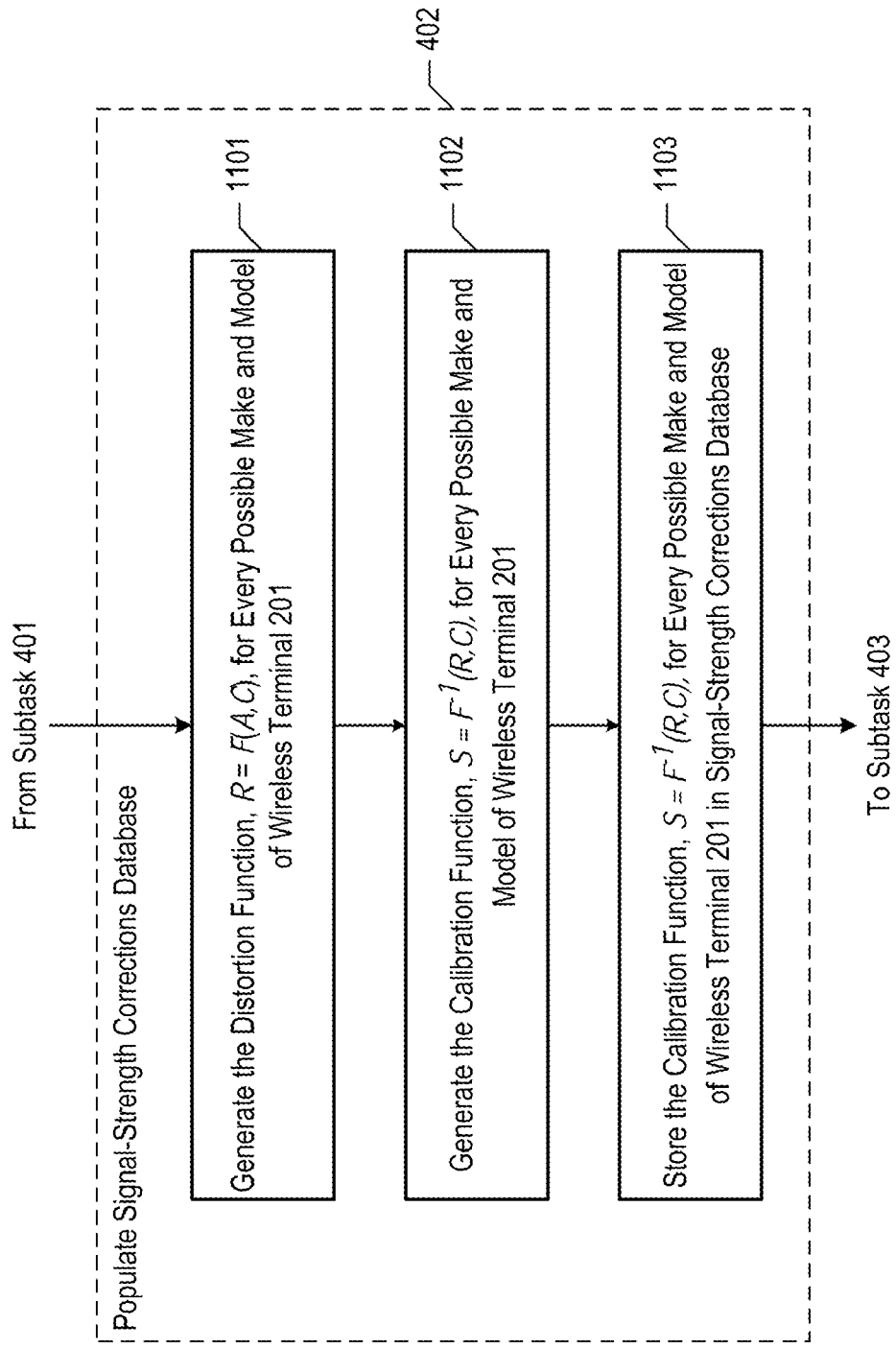
FIG. 11 depicts a flowchart of the salient subtasks performed as part of task 402.

Population of The Signal-Strength Corrections Database—FIG. 11 depicts a flowchart of the salient subtasks performed as part of task 402.

At subtask 1101, a distortion function F(A,C) is generated for every possible make and model, C, of wireless terminal 201. In general, the distortion function F(A,C) is the relationship of the reported signal-strength measurement, R, as a function of each actual signal strength, A, and the characteristic C. This relationship is represented by equation 3:

$$R = F(A, C) \quad \text{(Eq. 3)}$$

F(A,C) is a function defined within the range of $-110$ dBm $\leq R \leq -47$ dBm because that, in accordance with the GSM protocol, is the allowable extent of reported signal-strength measurements.

In accordance with the GSM protocol, wireless terminal 201 is capable of reporting the signal strength of a signal as one of 64 levels between $-47$ dBm and $-110$ dBm. When wireless terminal 201 measures a signal with a strength of $-46$ dBm or stronger, wireless terminal 201 simply transmits a reported signal-strength measurement of $-47$ dBm for that signal. Similarly, wireless terminal 201 is incapable of transmitting a reported signal-strength measurement of $-110$ dBm or weaker, and, therefore, when wireless terminal 201 measures a signal with a strength of $-110$ dBm or weaker, wireless terminal 201 simply transmits a reported signal-strength measurement of $-110$ dBm for that signal.

It will be clear to those skilled in the art, after reading this disclosure, how to make and use alternative embodiments of the present invention in which the reported signal-strength measurements have a different range of reportable measurements or no range restriction at all.

In accordance with the illustrative embodiment, the distortion function F(A,C) is provided to the owner/operator of location system 212 by the wireless terminal manufacturer. It will be clear to those skilled in the art, after reading this disclosure, how to generate the distortion function F(A,C) for a wireless terminal.

Figure 12:
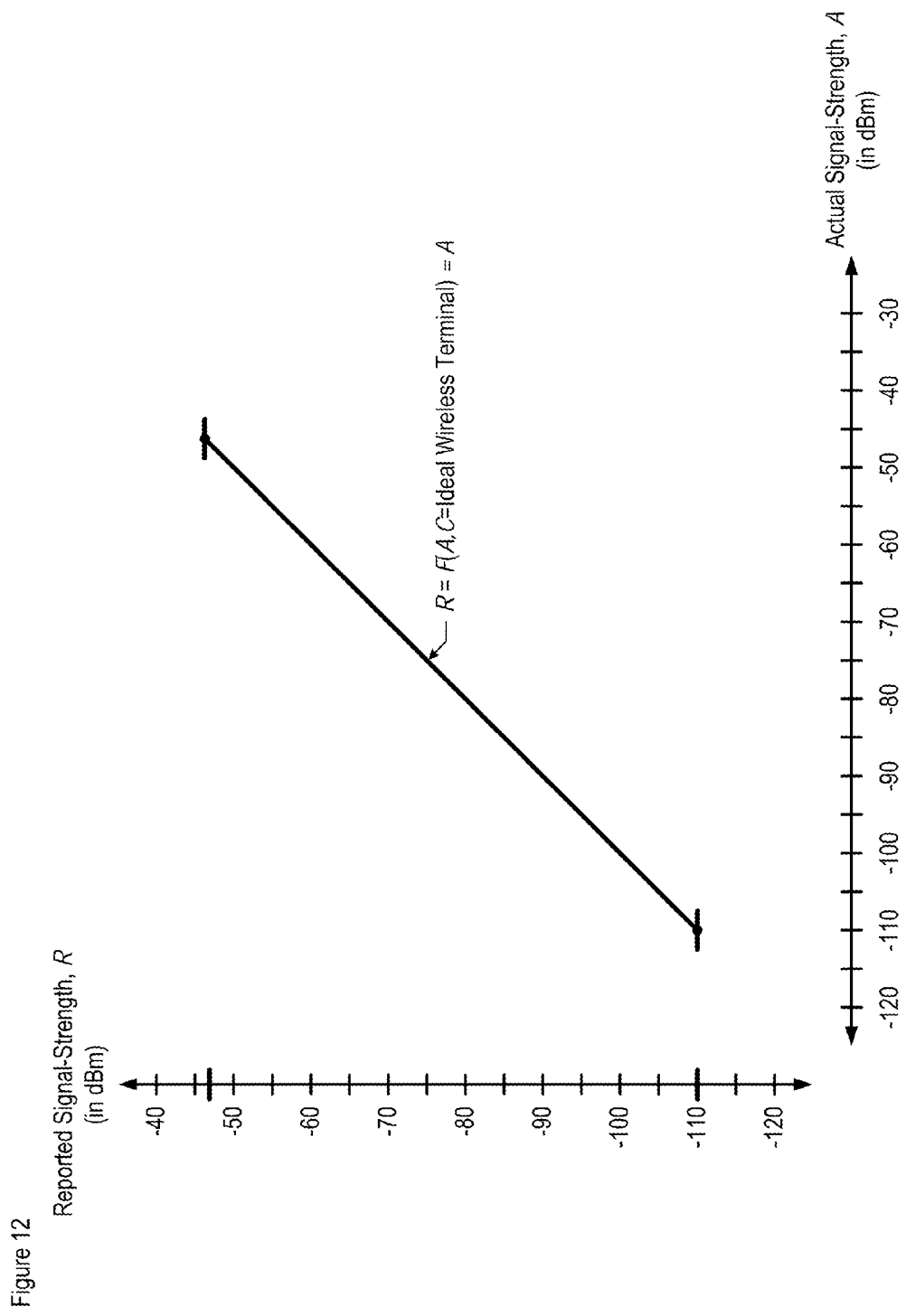
FIG. 12 depicts the distortion function $F(A,C)$ for an ideal wireless terminal.

An ideal wireless terminal perfectly measures and reports the signal strengths of the signals it receives and the distortion function F(A,C) for an ideal wireless terminal is depicted in FIG. 12. As can be seen from the graph in FIG. 12, the salient characteristic of an ideal wireless terminal is that the reported signal-strength measurement, R, is exactly equal to the actual signal strength, A (i.e., there is no distortion).

Figure 13:
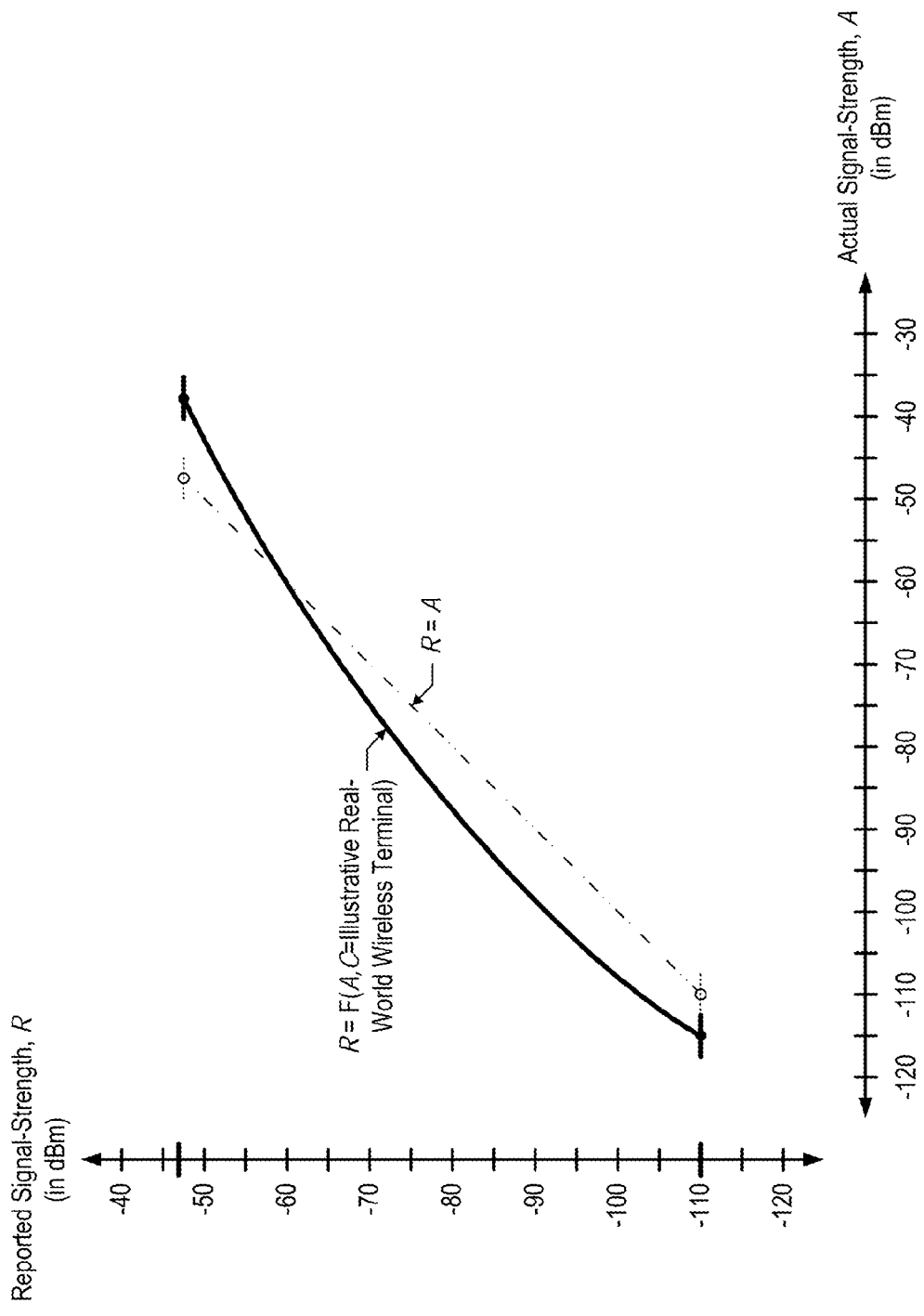
FIG. 13 depicts a graph of the relationship of reported signal-strength measurements as a function of actual signal strengths for an illustrative real-world wireless terminal.

In contrast, most real-world wireless terminals do not perfectly measure the signal strength of the signals they receive. For example, FIG. 13 depicts a graph of the relationship of reported signal-strength measurements as a function of actual signal strengths for an illustrative real-world wireless terminal. In this case, the reported signal-strength measurement is stronger than it should be between −110 dBm and −60 dBm, and the reported signal-strength measurement is weaker than it should be between −60 dBm and −47 dBm. Only at −60 dBm is the reported signal-strength measurement correct.

The magnitude of each of the errors in the reported signal-strength measurements is inherent in the distortion function F(A,C), and, therefore, knowledge of F(A,C) enables the measurement errors by wireless terminal 201 to be compensated for. In other words, when location system 212 knows exactly how a wireless terminal distorts a signal-strength measurement, it can correct—or calibrate—the reported signal-strength measurement with a calibration function to derive the actual signal strength. The calibration function is $F^{-1}(R,C)$, and it is generated in subtask 1102.

In accordance with the illustrative embodiment, the distortion function F(A,C) is represented in tabular form, such as that shown in Table 4.

TABLE 4

The Distortion function F(A, C) in Tabular Form

| | R = F(A, C) | | |
|---|---|---|---|
| A | C = Motorola Model A008 | ... | C = Samsung Model A800 |
| −110 | −115 | ... | −107 |
| −109 | −114 | ... | −106 |
| ... | ... | ... | ... |
| −48 | −38 | ... | −50 |
| −47 | −37 | ... | −49 |

At subtask 1102, the calibration function $F^{-1}(R,C)$ is generated for every possible make and model of wireless terminal 201.

In general, the calibration function $F^{-1}(R,C)$ is the relationship of the calibrated signal-strength measurements, S, as a function of the reported signal-strength measurements, R. This relationship is represented by equation 4:

$$S = F^{-1}(R,C) \quad \text{(Eq. 4)}$$

$F^{-1}(R,C)$ is a function defined within the domain of −110 dBm≦R≦−47 dBm because that, in accordance with the GSM protocol, is the allowable extent of reported signal-strength measurements.

Figure 14:
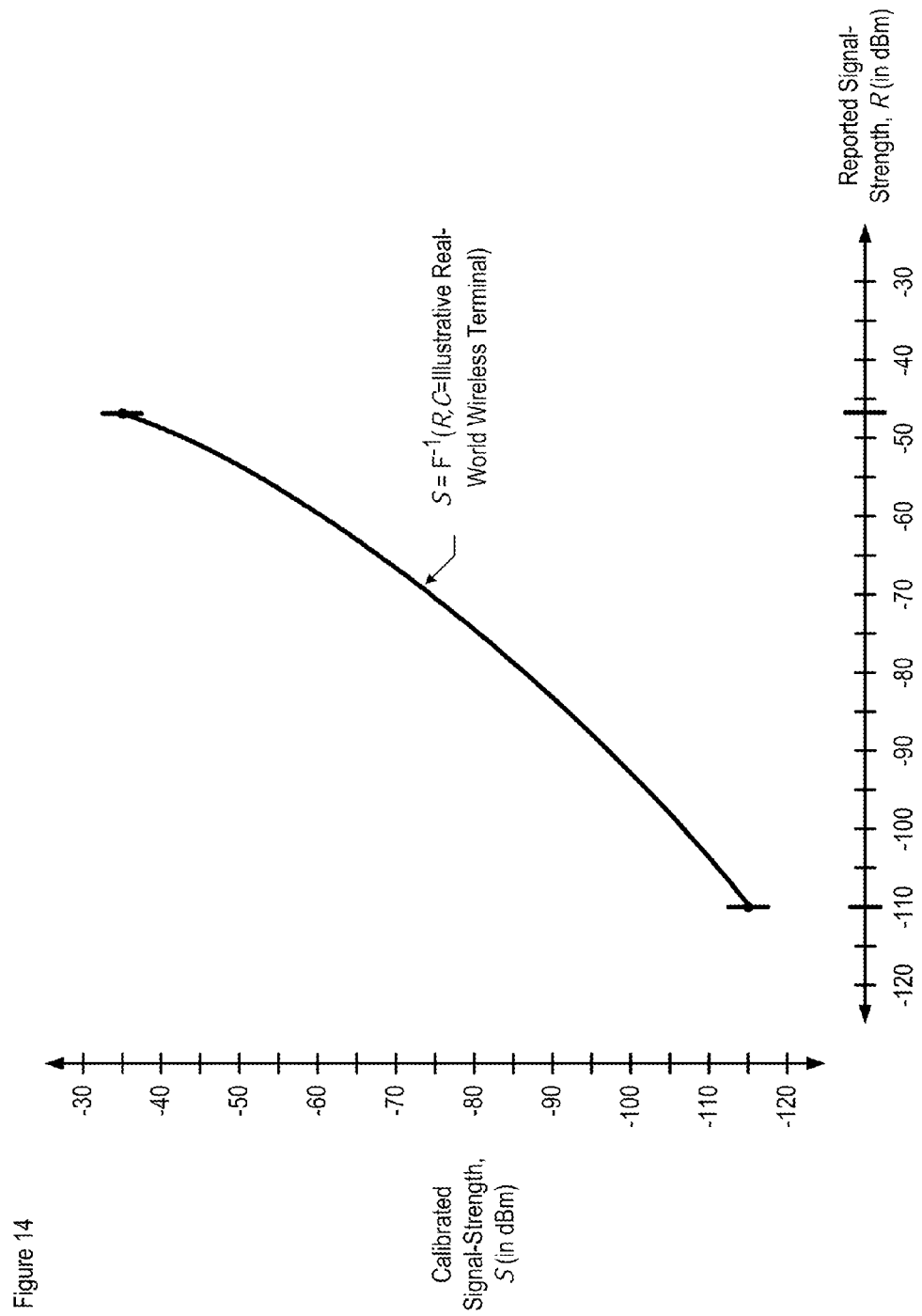
FIG. 14 depicts a graph of the calibration function $F^{-1}(R, C)$ for the distortion function $F(A,C)$ depicted in FIG. 13.

$F^{-1}(R,C)$ is the inverse of the distortion function F(A,C). In other words, the salient characteristic of the function $F^{-1}(R,C)$ is that it satisfies the equation 5:

$$S = F^{-1}(F(A,C),C) \quad \text{(Eq. 5)}$$

so that the calibrated signal-strength measurement, S, is what the reported signal-strength measurement, R, would have been had the wireless terminal making and reporting the measurement been ideal. It will be clear to those skilled in the art, after reading this disclosure, how to derive $F^{-1}(R,C)$ from F(A,C). FIG. 14 depicts a graph of the calibration function $F^{-1}(R,C)$ for the distortion function F(A,C) depicted in FIG. 13.

In accordance with the illustrative embodiment, the function $F^{-1}(R,C)$ is represented in tabular form, such as that shown in Table 5.

TABLE 5

The Calibration Function $F^1(R, C)$ in Tabular Form

| | $S = F^1(R, C)$ | | |
|---|---|---|---|
| R | C = Motorola Model A008 | ... | C = Samsung Model A800 |
| −110 | −115 | ... | −107 |
| −109 | −114 | ... | −106 |
| ... | ... | ... | ... |
| −48 | −38 | ... | −50 |
| −47 | −37 | ... | −49 |

At subtask 1103, processor 301 stores the calibration function $F^{-1}(R,C)$ in the Signal-Strength Corrections Database.

The purpose of the characteristic, C, is to identify which calibration function should be used in calibrating the reported signal-strength measurements from wireless terminal 201, and, therefore, the characteristic, C, should be as indicative of the actual distortion function for wireless terminal 201 as is economically reasonable.

For example, the characteristic, C, can be, but is not limited to:

i. the unique identity of wireless terminal 201 (e.g., its electronic serial number ("ESN"), its international mobile station identifier ("IMSI"), its temporary international mobile station identifier ("TIMSI"), mobile station identification ("MSID"), its directory number ("DN"), etc.); or ii. the model of wireless terminal 201 (e.g., Timeport 210c, etc.); or iii. the make (i.e., manufacturer) of wireless terminal 201 (e.g., Motorola, Samsung, Nokia, etc.); or iv. the identity of the radio-frequency circuitry of wireless terminal 201 (e.g., Motorola RF circuit design 465B, etc.); or v. the identity of one or more components of wireless terminal 201 (e.g., the part number of the antenna, the part number of the signal-strength measuring component, etc.); or vi. the distortion function, F(A,C), for wireless terminal 201; or vii. the calibration function, $F^{-1}(R,C)$, for wireless terminal 201; or viii. any combination of i, ii, iii, iv, v, vi, and vii.

The most accurate characteristic is probably the unique identity of wireless terminal 201 because that would enable location system 212 to use the calibration function generated for that very wireless terminal. It is unlikely, however, that this is economically feasible because it would require that every wireless terminal be tested to determine its own unique distortion function.

On the other hand, using only the make of wireless terminal 201 as the characteristic, C, is economically reasonable, but it is unlikely that a single calibration function for all of a manufacturer's wireless terminals would provide very accurate calibrated signal-strength measurements.

As a compromise, the illustrative embodiment uses the combination of make and model of wireless terminal 201 as the characteristic, C, because it is believed that the amount of variation between wireless terminals of the same model will be small enough that a single calibration function for that model should provide acceptably accurate calibrated signal-strength measurements without having to test every individual terminal.

It will be clear to those skilled in the art, however, after reading this disclosure, how to make and use alternative embodiments of the present invention in which the characteristic, C, is something else.

From subtask 1103, control passes to task 403 in FIG. 5.

Figure 15:
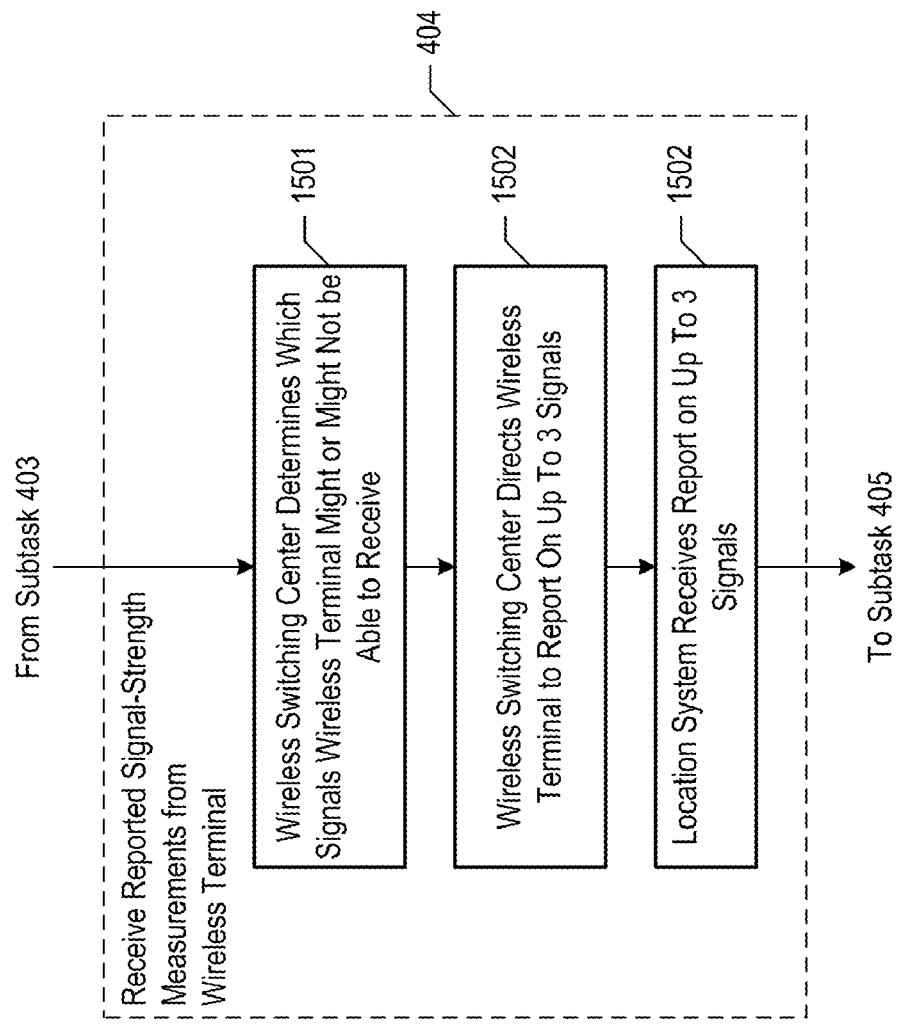
FIG. 15 depicts a flowchart of the salient subtasks performed as part of task 404.

Receive Reported Signal-Strength Measurements from Wireless Terminal 201—FIG. 15 depicts a flowchart of the salient subtasks performed as part of task 404.

At subtask 1501, wireless switching center 211 periodically determines, in well-known fashion, which signals wireless terminal 201 might or might not be able to receive. In accordance with the illustrative embodiment, wireless switching center 211 determines that wireless terminal 201 might be able to receive Signal 1, Signal 2, and Signal 3.

At subtask 1502, wireless switching center 211 periodically directs wireless terminal 201, in well-known fashion, to attempt to receive the signals that it might be able to receive and to report back a signal-strength value for the signals that wireless terminal 201 is able to receive and distinguish. In accordance with the illustrative embodiment, wireless switching center 211 directs wireless terminal 211 to monitor Signal 1, Signal 2, and Signal 3 and to report on all of these signals.

At subtask 1503, location system 212 receives, via wireless switching center 211, a Signal-Strength Measurement Report from wireless terminal 201 on the signals that it was directed to monitor in subtask 1502. Signal-Strength Measurement Report n from wireless terminal 201 comprises:

i. a tuple of reported signal-strength measurements {R(1, n), R(2,n), R(3,n)},
 ii. the time, t, at which the signal-strength measurements were made, and
 iii. a value of n, which indicates the relative order in which the signal-strength measurements are made.

In some alternative embodiments of the present invention, however, wireless terminal 201 provides the tuple of reported signal-strength measurements {R(1,n), R(2,n), R(3,n)}, the time t, and the value of n, to location system 212 as GPRS packet data and these reported signal-strength measurements are not be bounded by the −47 dBm to −110 dBm domain limitation imposed on GSM terminals in the prior art. This is advantageous because the quality of the estimate of the location of wireless terminal 201 is generally enhanced by the removal of the limitation on the dynamic range of the reported signal-strength measurements.

In some alternative embodiments of the present invention, wireless terminal 201 provides the signal-strength measurements on more than 3 signals to location system 212 as GPRS packet data as imposed on GSM terminals in the prior art either. This is advantageous because the quality of the estimate of the location of wireless terminal 201 is generally enhanced by increasing the number of reported signal-strength measurements given to location system 212.

In some alternative embodiments of the present invention, wireless terminal 201 provides—in addition to or instead of {R(1,n), R(2,n), R(3,n)}—the signal-strength measurements for signals that have nothing to do with providing telecommunications service to wireless terminal 201. Those signals can be, for example, commercial television or radio signals, aviation navigation signals, etc. The incorporation of signal-strength measurements for these kinds of signals can increase the quality of the estimate of the location of wireless terminal 201.

It will be clear to those skilled in the art, after reading this disclosure, how to make and use embodiments of the present invention that perform task 404. From subtask 1603, control passes to task 405 in FIG. 4.

Figure 16:
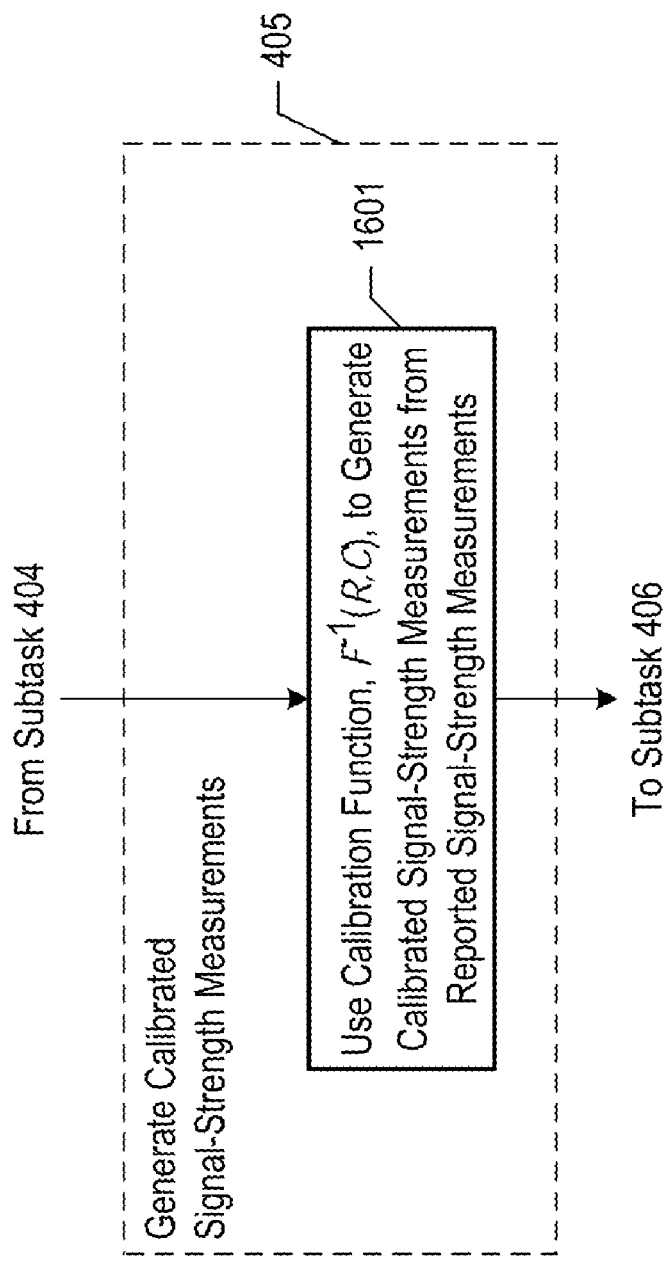
FIG. 16 depicts a flowchart of the salient subtasks performed as part of task 405.

Generate Calibrated Signal-Strength Measurements—FIG. 16 depicts a flowchart of the salient subtasks performed as part of task 405.

At subtask 1601, processor 301 uses the calibration function, $F^{-1}(R,C)$, for the make and model of terminal specified for wireless terminal 201 to generate the tuple of calibrated signal-strength measurements {S(1,n), S(2,n), S(3,n)} from the tuple of reported signal-strength measurements {R(1,n), R(2,n), R(3,n)}. It will be clear to those skilled in the art, after reading this disclosure, how to make and use embodiments of the present invention that perform task 1601.

From subtask 1602, control passes to task 406 in FIG. 4.

Figure 17:
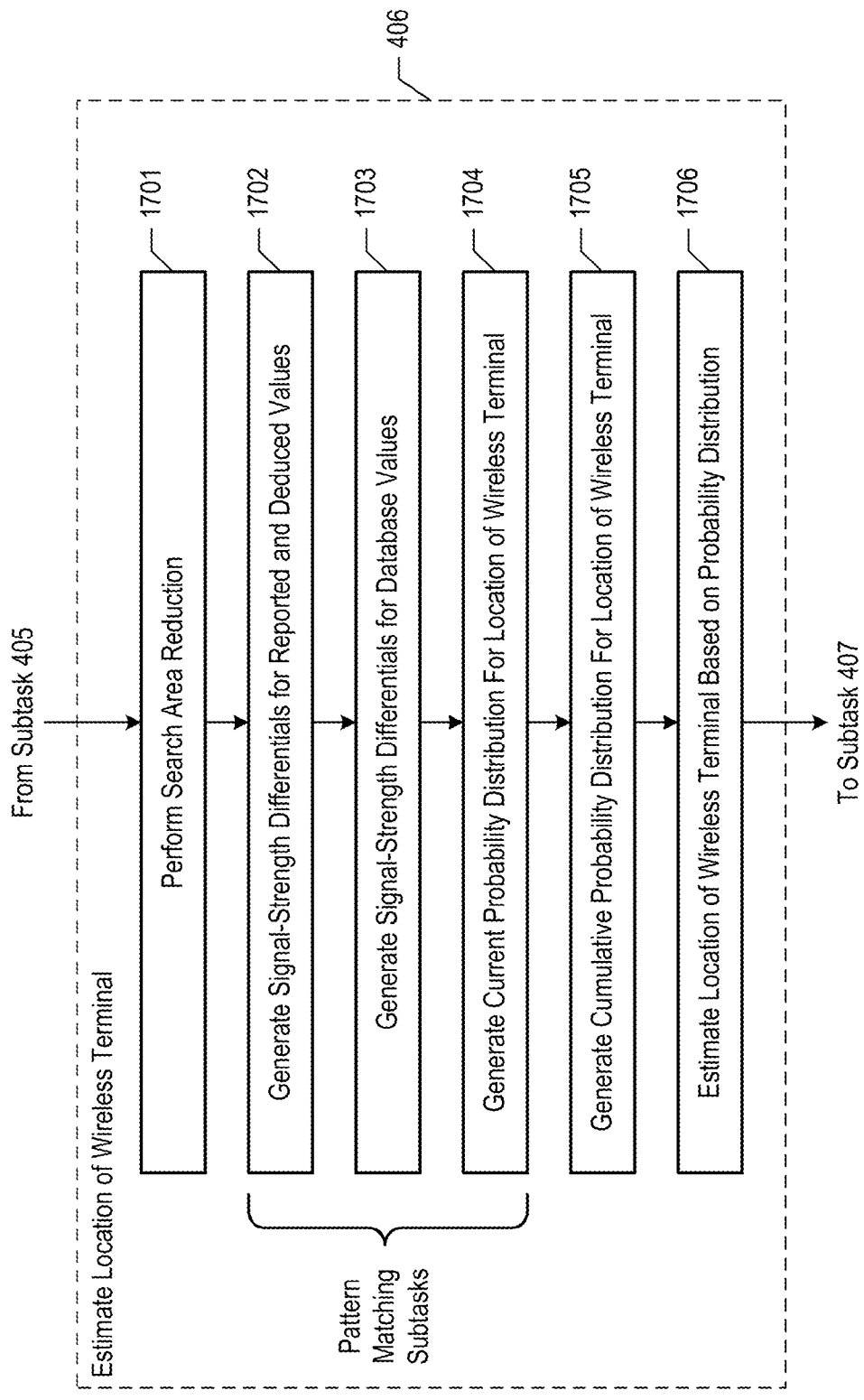
FIG. 17 depicts a flowchart of the salient subtasks performed as part of task 406.

Estimation of the Location of Wireless Terminal 201—FIG. 17 depicts a flowchart of the salient subtasks performed as part of task 406.

Estimation in General—Subtask 1701 begins with 152 candidate locations that must be considered as the location for wireless terminal 201. Subtasks 1702 through 1705 can be computationally intense, and the computational burden increases markedly with the number of candidate locations that must be processed. Therefore, processor 301 attempts, at subtask 1701, to reduce the number of candidate locations that must be processed.

To reduce the number of candidate locations that must be processed, processor 301 employs a technique called "search area reduction." In accordance with search area reduction, the probability that wireless terminal 201 is at some candidate locations is calculated to be very close to zero, and, therefore, that candidate location is excluded from consideration in subtasks 1702 through 1705, but is considered in subtask 1706. To the extent that search area reduction can exclude a location from consideration, the computational burden of subtasks 1702 through 1705 is reduced.

A candidate location is summarily excluded only when it is highly improbable that it is the actual location. A candidate location at x,y is excluded when, and only when, the following is true:

$$\forall i \in \{1,2,3\}, \forall j \in \{n-\Omega, n-\Omega+1, \ldots, n-2, n-1, n\} |E(i,x,y,t) - S(i,j)| \geq \Psi \qquad \text{(Eq. 6)}$$

wherein t corresponds in time to when the measurement underlying S(i,j) was taken, ψ is a positive real number, and Ω is a positive integer. In essence, the test excludes a candidate location only when the calibrated signal-strength measurements have been substantially different from the expected signal strengths at that location for the last Ω measurements.

In accordance with the illustrative embodiment, ψ=20 dBm. The value ψ=20 dBm is chosen for the illustrative embodiment because it is unlikely that a calibrated signal-strength measurement for a location will be more than 20 dBm different than the expected signal strength for the actual location of wireless terminal 201. It will be clear to those skilled in the art, however, how to make and use alternative embodiments of the present invention that have a different value for ψ.

High values of ψ are advantageous in that they make the likelihood of erroneously eliminating from consideration the actual location of wireless terminal 201 small, but are disadvantageous in that they undermine most of the potential advantage of search area reduction. In contrast, low values of ψ are advantageous in that they eliminate the greatest number of candidate locations from consideration but are disadvantageous in that they increase the likelihood that search area reduction will erroneously eliminate from consideration the actual location of wireless terminal 201.

In accordance with the illustrative embodiment, Ω=25. The value Ω=25 is chosen for the illustrative embodiment because it is highly unlikely that all of the last Ω=25 calibrated signal-strength measurements for a location are more than ψ dBm different from the expected signal strength for the actual location of wireless terminal 201. It will be clear to those skilled in the art, however, how to make and use alternative embodiments of the present invention that have a different value for Ω.

High values of Ω are advantageous in that they make the likelihood of erroneously eliminating from consideration the actual location of wireless terminal 201 small, but are disadvantageous in that they undermine most of the potential advantage of search area reduction. In contrast, low values of Ω are advantageous in that they eliminate the greatest number of candidate locations from consideration but are disadvantageous in that they increase the likelihood that search area reduction will erroneously eliminate from consideration the actual location of wireless terminal 201.

At subtask 1702, processor 301 computes the signal-strength differentials for all of the calibrated signal-strength measurements whose reported signal-strength measurements are not "saturated." A reported signal-strength measurement is "saturated" when the measurement is at one of the bounds of the range at which a measurement can be reported. In accordance with the illustrative embodiment, reported signal-strength measurements of −47 dBm and −110 dBm are saturated because they are the maximum and minimum reportable values, respectively.

The calibrated signal-strength measurements whose reported signal-strength measurements are saturated are used for search area reduction in subtask 1701, but are not used in computing signal-strength differentials because their saturated nature prevents the true magnitude they represent from being known with enough certainty to be useful in computing signal-strength differentials.

When the tuple of calibrated signal-strength measurements {S(1,n), S(2,n), S(3,n)} comprises m measurements that are not saturated, an m-tuple of calibrated signal-strength measurements {N(1,n), ... N(m,n)} is selected from the tuple of calibrated signal-strength measurements {S(1,n), S(2,n), S(3,n)}, wherein m is a non-negative integer and m≦n.

Then m−1 signal-strength measurement differentials are generated between different pairs of signal-strength measurements {N(1,n), ... N(m,n)}. For example:

$$\Delta N(k,n) = N(k+1,n) - N(k,n) \quad \text{(Eq. 7)}$$

wherein k=1, 2, 3, ... m−1, and ΔN(k,n) is the kth signal-strength measurement differential for Report n.

At the end of subtask 1702, processor 301 will have generated m−1 signal-strength measurement differentials, {N(1,n), ... N(m,n)}, for all of the candidate locations not excluded in subtask 1701.

At subtask 1703, processor 301 computes the expected signal-strength differentials:
  i. for all of the locations not excluded from consideration in subtask 1701,
  ii. for only those signals that correspond to those used to compute ΔN(k,n), and
  iii. that correspond in time to when the measurements underlying ΔN(k,n) were made.

The idea behind limitations (ii) and (iii) is, of course, to ensure that "apples are compared with apples" in subtask 1704 below. In particular, m−1 expected signal-strength differentials are generated where:

$$\Delta E(k,x,y,t) = E(k+1,x,y,t) - E(k,x,y,t) \quad \text{(Eq. 8)}$$

for k=1, 2, 3, ... m−1, wherein ΔE(k,x,y,t) is the kth expected signal-strength differential for location x,y, and E(k,x,y,t) is the expected signal strength of the same signal as N(k,n) at location x,y at the time t when the measurements underlying ΔN(k,n) were made.

At the end of subtask 1703, processor 301 will have generated m−1 expected signal-strength differentials, ΔE(1,x,y,t) through ΔE(m−1,x,y,t), for all of the candidate locations not excluded in subtask 1701.

At subtask 1704, processor 301 generates the "current probability distribution" for the location of wireless terminal 201 based on the most recently received reported signal-strength measurements (i.e., the data derived from {S(1,n), S(2,n), S(3,n)} only). In contrast, at subtask 1705, processor 301 generates the "cumulative probability distribution" for the location of wireless terminal 201 based on all of the received reported signal-strength measurements (i.e., the data derived from {S(1,n), S(2,n), S(3,n)}, {S(1,n−1), S(2,n−1), S(3,n−1)}, {S(1,n−2), S(2,n−2), S(3,n−2)}, ... etc.). This enables the illustrative embodiment to combine signal-strength measurements from different times to generate an estimate of the location of wireless terminal 201 that is more accurate than the estimate that is derivable from signal-strength measurements made at any one time alone.

Figure 18:
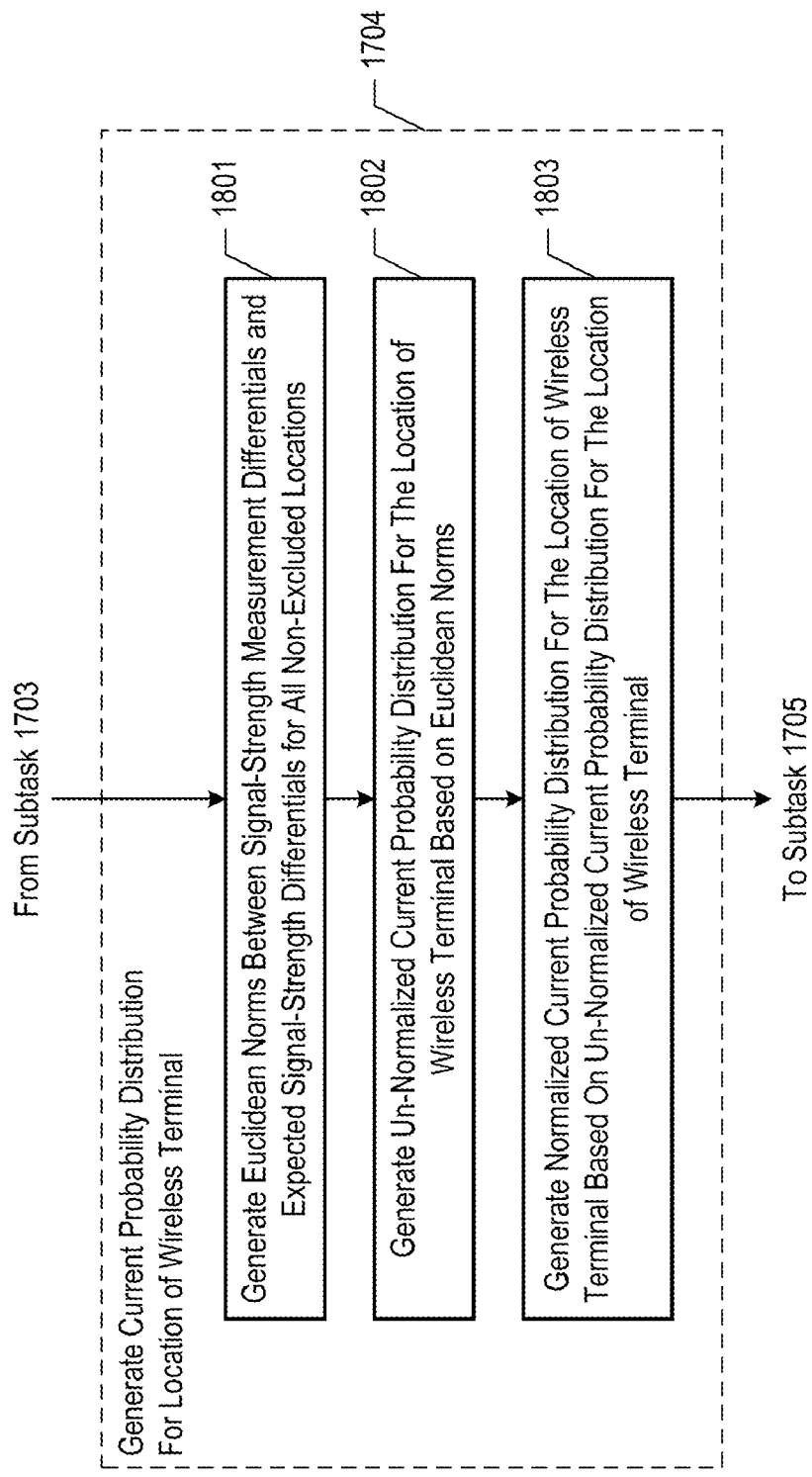
FIG. 18 depicts a flowchart of the salient subtasks performed in subtask 1704.

FIG. 18 depicts a flowchart of the salient subtasks performed in subtask 1704. At subtask 1704, processor 301 compares the m−1 signal-strength measurement differentials, ΔN(1,n) through ΔN(m−1,n), to the m−1 expected signal-strength differentials, ΔE(1,x,y,t) through ΔE(m−1,x,y,t), for each location to generate a probability distribution that indicates the goodness of fit between the signal-strength measurement differentials, ΔN(1,n) through ΔN(m−1,n), and the expected signal-strength differentials, ΔE(1,x,y,t) through ΔE(m−1,x,y,t), at each location.

To accomplish this, at subtask 1801, the Euclidean norm is generated between the signal-strength measurement differentials, ΔN(1,n) through ΔN(m−1,n), and the expected signal-strength differentials, ΔE(1,x,y,t) through ΔE(m−1,x,y,t), at each location. This is described in Equation 9:

$$\forall x, y\, V(x, y, n) = \sqrt{\sum_{2}^{m-1} (\Delta E(k, x, y, t) - \Delta N(k, n))^2} \quad \text{(Eq. 9)}$$

wherein V(x,y,n) is the Euclidean norm at location x,y based on the data derived from {S(1,n), S(2,n), S(3,n)} only.

At subtask 1802, the Euclidean norms generated in Equation 9 are turned into un-normalized probabilities of the location of wireless terminal 201 by Equation 10.

$$UP(x, y, n) = e^{\left(\frac{-V^2(x,y,n)}{\delta^2}\right)} \quad \text{(Eq. 10)}$$

wherein UP(x,y,n) represents the un-normalized probability that wireless terminal 201 is at location x,y based on the data derived from {S(1,n), S(2,n), S(3,n)} only, and wherein δ² represents the amount of uncertainty in both ΔS(k,n) and ΔE(k,x,y,n) and equals:

$$\delta^2 = \delta_E^2 + \delta_M^2 \quad \text{(Eq. 11)}$$

wherein $\delta_E^2$ is the square of the uncertainty in the error in the Expected Signal-Strength Database and $\delta_M^2$ is the square of the uncertainty in the error in calibrated signal-strength measurements. It will be clear to those skilled in the art, after reading this disclosure, how to generate $\delta^2$. Candidate locations that were summarily excluded from consideration in subtask 1701 are assigned a probability of zero (0) in subtask 1802.

At subtask 1803, the probabilities generated in subtask 1802 are normalized. This is described in Equation 12.

$$NP(x, y, n) = \frac{UP(x, y, n)}{\forall x, y \sum UP(x, y, n)} \quad \text{(Eq. 12)}$$

wherein NP(x,y,n) represents the normalized probability that wireless terminal 201 is at location x,y based on the data derived from {S(1,n), S(2,n), S(3,n)} only. In some alternative embodiments of the present invention, the location of wireless terminal 201 is estimated based on the geometric mean of NP(x,y,n) for all x and y, or the maximum likelihood function, but in accordance with the illustrative embodiment, the estimate is based on the cumulative normalized probability distribution generated in subtask 1705.

From subtask 1803, control passes to subtask 1705 in FIG. 17.

Figure 19:
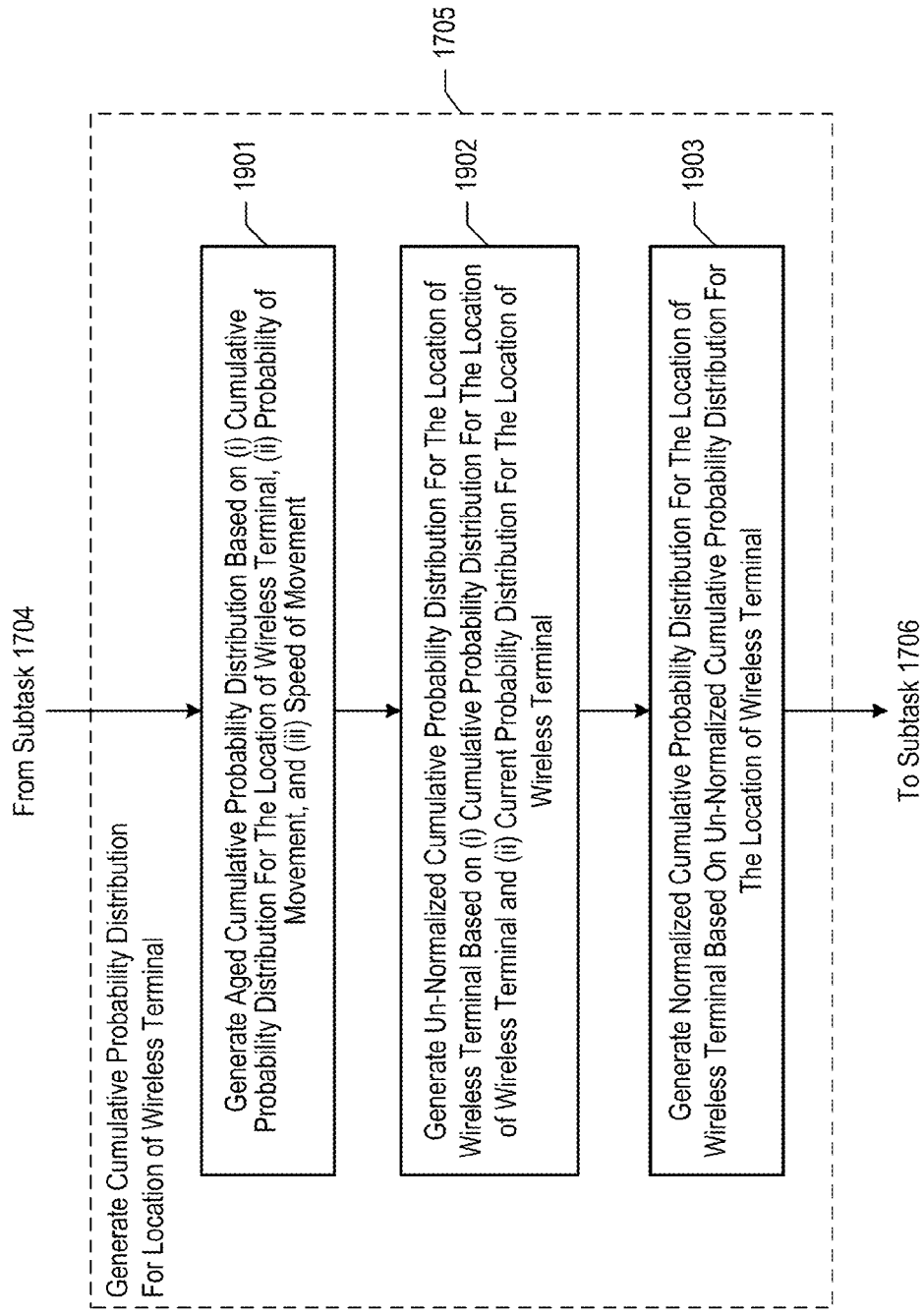
FIG. 19 depicts a flowchart of the salient subtasks performed in subtask 1705.

At subtask 1705, processor 301 generates the "cumulative probability distribution" for the location of wireless terminal 201 based on all of the received reported signal-strength measurements (i.e., the data derived from {S(1,n), S(2,n), S(3,n)}, {S(1,n−1), S(2,n−1), S(3,n−1)}, {S(1,n−2), S(2,n−2), S(3,n−2)}, ... etc.). FIG. 19 depicts a flowchart of the salient subtasks performed in subtask 1705.

At subtask 1901, the cumulative probability distribution for the location of wireless terminal 201, NB(x,y,n−1), is "aged" to compensate for the probable motion of wireless terminal 201 between the time when the measurements underlying {S(1,n), S(2,n), S(3,n)} and {S(1,n−1), S(2,n−1), S(3,n−1)} were made. The aging of the cumulative probability distribution enables "apples to be compared with apples" when the cumulative probability distribution is combined with the current probability distribution, NP(x,y,n).

The cumulative probability distribution is aged because it is not reasonable to combine the prior probability distribution with the most-recently generated probability distribution because they do not have the same value in estimating where the wireless terminal is at the time the most recent measurements were taken. But that does not mean that the prior probability distribution is worthless. On the contrary, the cumulative probability distribution, as compensated for the probable motion and likely speed of wireless terminal 201, is very valuable.

There are two parameters that define the rate at which the cumulative probability distribution is aged: $\alpha$ and $\beta$. $\alpha$ is a positive integer and represents the average speed with which wireless terminal 201 is believed to move. In accordance with the illustrative embodiment, the dimensions of $\alpha$ are length/time and the units are locations per Signal-Strength Measurement Report. It will be clear to those skilled in the art, however, after reading this specification, how to make and use alternative embodiments of the present invention in which the units are something else (e.g., meter/second, miles/hour, etc.)

$\beta$ is a normalized probability (i.e., $0 \leq \beta \leq 1$) that wireless terminal 201 does not change locations between successive Signal-Strength Measurement Reports.

In accordance with the illustrative embodiment, $\alpha=1$ and $\beta=0.5$, but it will be clear to those skilled in the art, after reading this disclosure, how to make and use alternative embodiments of the present invention in which $\alpha$ and $\beta$ have different values. Typically, $\beta$ will be between 0.30 and 0.80. In accordance with the illustrative embodiment, it is equally probable that wireless terminal 201 will move in any direction (i.e., the probability of moving is isotropic).

One way to visualize the aging of the cumulative probability distribution is to imagine melting a three-dimensional wax model of the cumulative probability distribution in which the probability dimension is depicted vertically. As heat is applied to the model and the wax begins to melt, the wax flows under the pull of gravity. At first, the model is only slightly distorted, but over time the wax flows until it is evenly distributed. In the metaphor of the melting wax model, $\alpha$ is analogous to the viscosity of the wax—higher values of $\alpha$ correspond to lower viscosity—and $\beta$ is analogous to the rate at which the model melts—higher values of $\beta$ correspond to slower melting.

Figure 20:
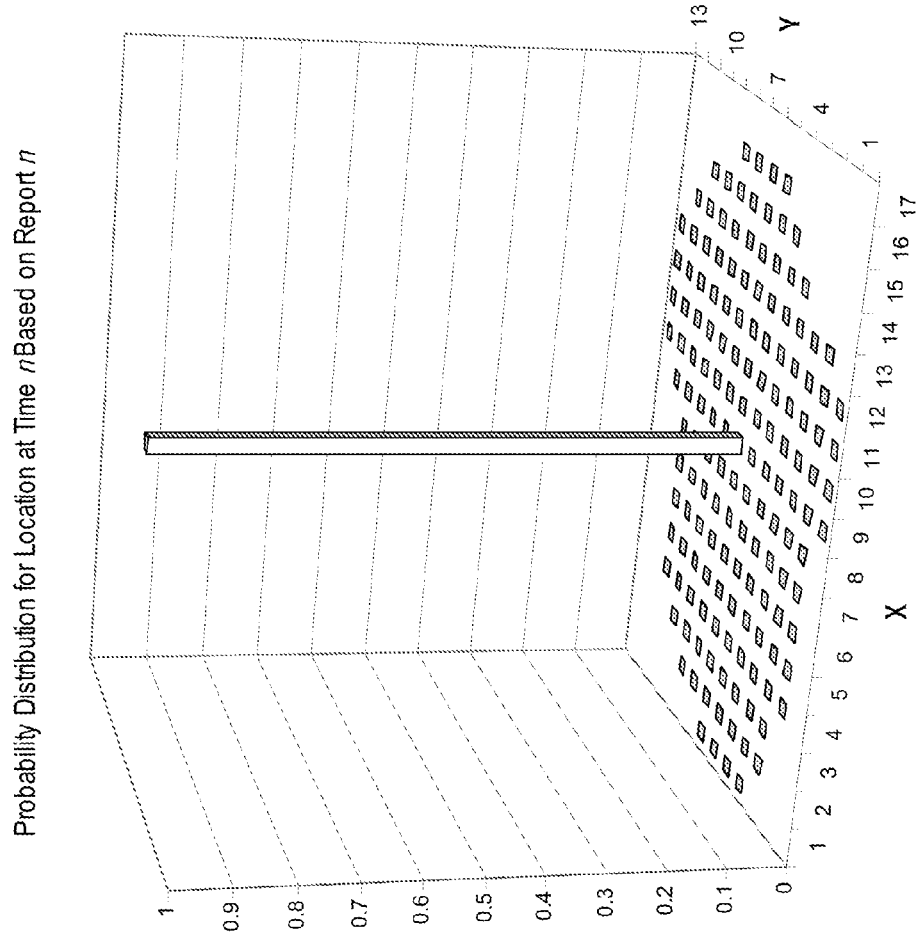
FIG. 20 depicts a graph of the probability distribution for the location of wireless terminal 201 for the data depicted in Table 6.

An illustration of how one probability distribution ages over time is helpful in gaining an intuitive understanding of the aging process. In this example, FIG. 20 depicts a probability distribution based on Report n at time n, wherein the location of the wireless terminal is known with certainty to be at location X=9, Y=7. In this example, $\alpha=1$ and $\beta=0.5$.

Figure 21:
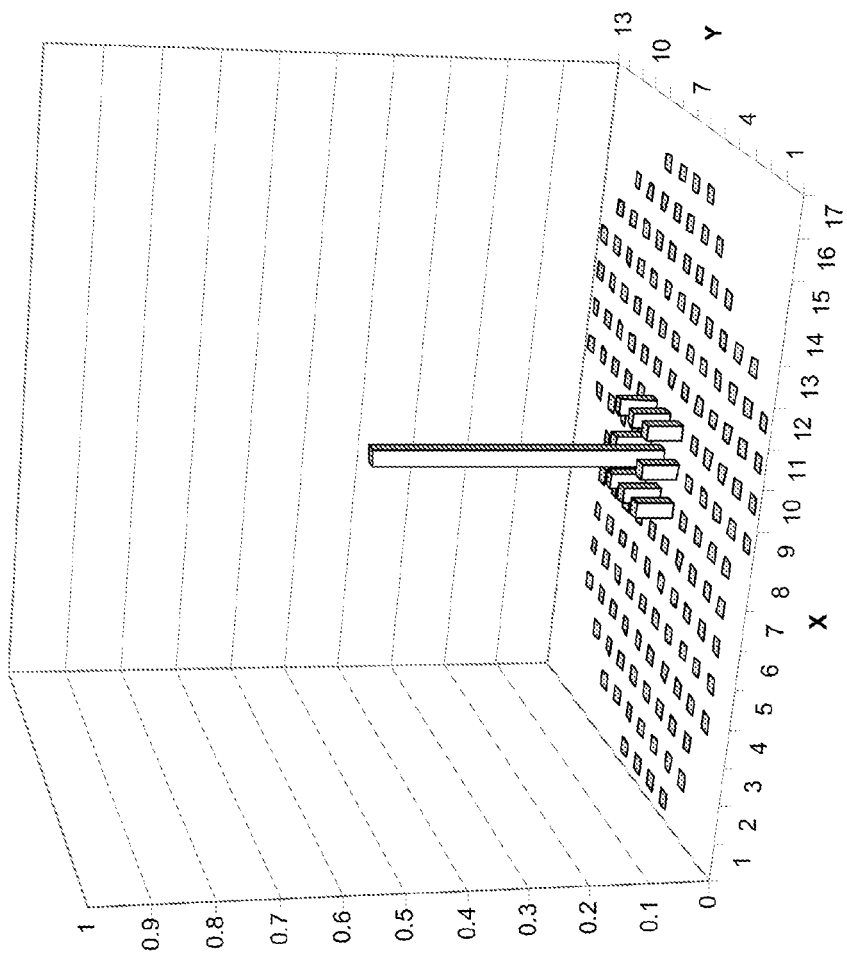
FIG. 21 depicts a graph of the probability distribution for the location of wireless terminal 201 for the data depicted in Table 7.
Figure 22:
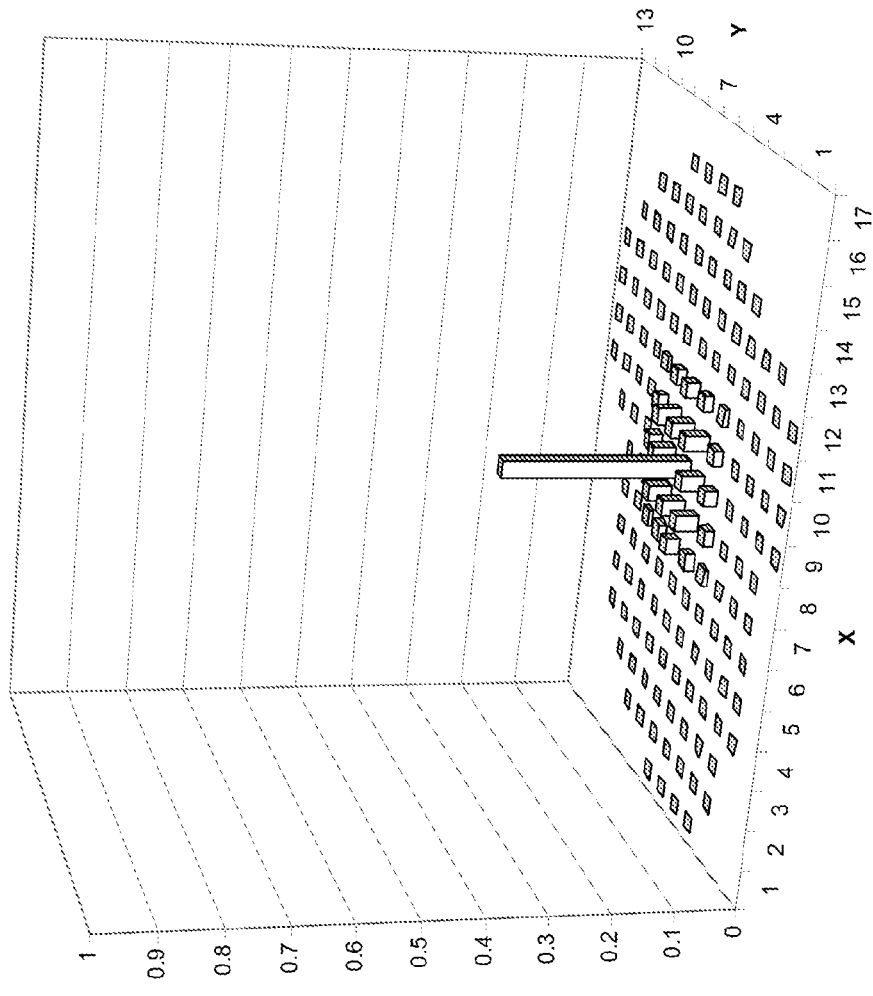
FIG. 22 depicts a graph of the probability distribution for the location of wireless terminal 201 for the data depicted in Table 8.
Figure 23:
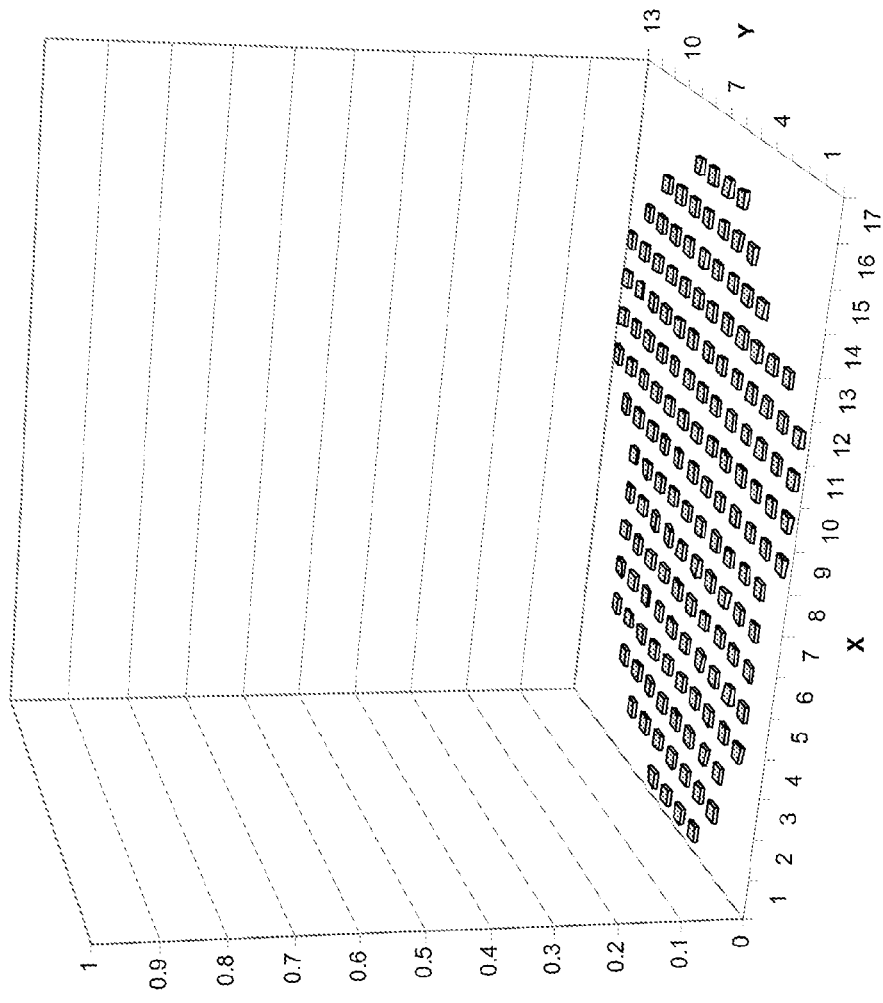
FIG. 23 depicts a graph of the probability distribution for the location of wireless terminal 201 for the data depicted in Table 9.

After the time associated with one Signal-Strength Measurement Report has passed, the Probability Distribution in FIG. 20 ages into that depicted in FIG. 21. After the time associated with another Report has passed, it ages into that depicted in FIG. 22. And finally, after the time associated with another 1000 Reports has passed, it ages into that depicted in FIG. 23. A probability distribution that is initially more complex ages in an analogously more complex manner, but it always ends up looking like the distribution in FIG. 32. FIGS. 20 through 23 accurately reflect the common sense notion that a probability distribution loses value in estimating the location of wireless terminal 201 as time goes on.

The aging of the cumulative probability distribution for the location of wireless terminal 201 is described in Equation 13 (for $\alpha=1$).

$$\forall x, y \, AB(x, y, n-1) = \frac{(9\beta - 1)}{8} NB(x, y, n-1) + \frac{(1-\beta)}{8} \sum_{i=-1}^{+1} \sum_{j=-1}^{+1} NB(x+i, y+j, n-1) \quad \text{(Eq. 13)}$$

Wherein AB(x,y,n−1) is the aged cumulative probability distribution.

At subtask 1902, the un-normalized cumulative probability distribution for the location of wireless terminal 201, UB(x,y,n), is generated based on the aged cumulative probability distribution, AB(x,y,n−1), and the current normalized probability distribution, NP(x,y,n). This is described in Equation 14.

$$\forall x, y \, UB(x,y,n) = AB(x,y,n-1) \times NP(x,y,n) \quad \text{(Eq. 14)}$$

At subtask 1903, the un-normalized cumulative probability distribution for the location of wireless terminal 201, UB(x,y,n), is normalized to generate the normalized cumulative probability distribution for the location of wireless terminal 201, NB(x,y,n). This is described in Equation 14.

$$NB(x, y, n) = \frac{UB(x, y, n)}{\forall x, y \sum UB(x, y, n)} \quad \text{(Eq. 15)}$$

From subtask 1902, control passes to subtask 1706 in FIG. 17.

At subtask 1706, processor 302 estimates the location of wireless terminal 201 based on the normalized cumulative probability distribution for the location of wireless terminal 201, NB(x,y,n), generated in subtask 1903. In accordance with the illustrative embodiment, processor 302 estimates the location of wireless terminal 201 based on the geometric mean of the normalized cumulative probability distribution generated in subtask 1705.

After reading this disclosure, however, it will be clear to those skilled in the art, after reading this disclosure, how to make and use alternative embodiments of the present invention that estimate the location of wireless terminal 201 based on another function of the normalized cumulative probability distribution, such as, for example, the maximum likelihood function.

From subtask 1706, control passes to task 404 in FIG. 4.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A process comprising:
receiving a first reported signal-strength measurement, R(1,n), from a wireless terminal; and
generating a first calibrated signal-strength measurement, S(1,n), based on: (i) the first reported signal-strength measurement, R(1,n), and (ii) an identifying characteristic, C, of the wireless terminal;
wherein the first reported signal strength is for a first signal received by the wireless terminal; and
wherein the identifying characteristic, C, identifies the wireless terminal in comparison to another wireless terminal capable of receiving the first signal.

2. The process of claim 1 wherein the identifying characteristic, C, of the wireless terminal is the unique identity of the wireless terminal.

3. The process of claim 1 wherein the identifying characteristic, C, of the wireless terminal is the subscriber identity associated with the wireless terminal.

4. The process of claim 1 wherein the identifying characteristic, C, of the wireless terminal is the model of the wireless terminal.

5. The process of claim 1 wherein the identifying characteristic, C, of the wireless terminal comprises a feature of the radio-frequency circuitry of the wireless terminal.

6. The process of claim 1 wherein the identifying characteristic, C, of the wireless terminal is at least one component of the wireless terminal.

7. The process of claim 1 wherein the identifying characteristic, C, of the wireless terminal is the make of the wireless terminal.

8. The process of claim 1 further comprising receiving the identifying characteristic, C, of the wireless terminal from the wireless terminal.

9. The process of claim 1 further comprising estimating the location of the wireless terminal based on the first calibrated signal-strength measurement, S(1,n).

10. A machine comprising:
a receiver for receiving a first reported signal-strength measurement, R(1,n), from a wireless terminal; and
a processor for generating a first calibrated signal-strength measurement, S(1,n), based on: (i) the first reported signal-strength measurement, R(1,n), and (ii) an identifying characteristic, C, of the wireless terminal;
wherein the first reported signal strength is for a first signal received by the wireless terminal; and
wherein the identifying characteristic, C, identifies the wireless terminal in comparison to another wireless terminal capable of receiving the first signal.

11. The machine of claim 10 wherein the identifying characteristic, C, of the wireless terminal is the unique identity of the wireless terminal.

12. The machine of claim 10 wherein the identifying characteristic, C, of the wireless terminal is the subscriber identity associated with the wireless terminal.

13. The machine of claim 10 wherein the identifying characteristic, C, of the wireless terminal is the model of the wireless terminal.

14. The machine of claim 10 wherein the identifying characteristic, C, of the wireless terminal comprises a feature of the radio-frequency circuitry of the wireless terminal.

15. The machine of claim 10 wherein the identifying characteristic, C, of the wireless terminal is at least one component of the wireless terminal.

16. The machine of claim 10 wherein the identifying characteristic, C, of the wireless terminal is the make of the wireless terminal.

17. The machine of claim 10 wherein the receiver is also for receiving the identifying characteristic, C, of the wireless terminal from the wireless terminal.

18. The machine of claim 10 wherein the processor is also for estimating the location of the wireless terminal based on the first calibrated signal-strength measurement, S(1,n).

19. A process comprising:
generating a first calibrated signal-strength measurement, S(1,n), based on (i) a first reported signal-strength measurement, R(1,n), as made by a wireless terminal and (ii) an identifying characteristic, C, of the wireless terminal; and
estimating the location of the wireless terminal based on the first calibrated signal-strength measurement, S(1,n);
wherein the first reported signal strength is for a first signal received by the wireless terminal; and
wherein the identifying characteristic, C, identifies the wireless terminal in comparison to another wireless terminal capable of receiving the first signal.

20. The process of claim 19 wherein the identifying characteristic, C, of the wireless terminal is the unique identity of the wireless terminal.

21. The process of claim 19 wherein the identifying characteristic, C, of the wireless terminal is the subscriber identity associated with the wireless terminal.

22. The process of claim 19 wherein the identifying characteristic, C, of the wireless terminal is the model of the wireless terminal.

23. The process of claim 19 wherein the identifying characteristic, C, of the wireless terminal comprises a feature of the radio-frequency circuitry of the wireless terminal.

24. The process of claim 19 wherein the identifying characteristic, C, of the wireless terminal is at least one component of the wireless terminal.

25. The process of claim 19 wherein the identifying characteristic, C, of the wireless terminal is the make of the wireless terminal.

26. The process of claim 19 wherein the identifying characteristic, C, of the wireless terminal is provided by the wireless terminal.

27. A machine comprising:
a receiver for receiving a first reported signal-strength measurement, $R(1,n)$, as made by a wireless terminal; and
a processor for:
generating a first calibrated signal-strength measurement, $S(1,n)$, based on (i) the first reported signal-strength measurement, $R(1,n)$, and (ii) a identifying characteristic, C, of the wireless terminal; and
estimating the location of the wireless terminal based on the first calibrated signal-strength measurement, $S(1,n)$;
wherein the first reported signal strength is for a first signal received by the wireless terminal; and
wherein the identifying characteristic, C, identifies the wireless terminal in comparison to another wireless terminal capable of receiving the first signal.

28. The machine of claim 27 wherein the identifying characteristic, C, of the wireless terminal is the unique identity of the wireless terminal.

29. The machine of claim 27 wherein the identifying characteristic, C, of the wireless terminal is the subscriber identity associated with the wireless terminal.

30. The machine of claim 27 wherein the identifying characteristic, C, of the wireless terminal is the model of the wireless terminal.

31. The machine of claim 27 wherein the identifying characteristic, C, of the wireless terminal comprises a feature of the radio-frequency circuitry of the wireless terminal.

32. The machine of claim 27 wherein the identifying characteristic, C, of the wireless terminal is at least one component of the wireless terminal.

33. The machine of claim 27 wherein the identifying characteristic, C, of the wireless terminal is the make of the wireless terminal.

34. The machine of claim 27 wherein the receiver is also for receiving the identifying characteristic, C, of the wireless terminal as reported by the wireless terminal.

* * * * *